(12) United States Patent
Donya

(10) Patent No.: US 11,217,354 B1
(45) Date of Patent: Jan. 4, 2022

(54) POLYESTER NANOCOMPOSITES FOR PROTECTION FROM HAZARDOUS RADIATION USED FOR MEDICAL APPLICATIONS

(71) Applicant: KING ABDULAZIZ UNIVERSITY, Jedday (SA)

(72) Inventor: Hossam Elsayed Donya, Jeddah (SA)

(73) Assignee: King Abdulaziz University, Jeddah (SA)

( * ) Notice: Subject to any disclaimer, the term of this patent is extended or adjusted under 35 U.S.C. 154(b) by 0 days.

(21) Appl. No.: 17/063,982

(22) Filed: Oct. 6, 2020

(51) Int. Cl.
   - *G21F 1/10* (2006.01)
   - *C08K 3/22* (2006.01)
   - *C08J 3/21* (2006.01)
   - *G21F 1/08* (2006.01)

(52) U.S. Cl.
   CPC ............ *G21F 1/085* (2013.01); *C08J 3/212* (2013.01); *C08K 3/22* (2013.01); *G21F 1/10* (2013.01); *G21F 1/103* (2013.01); *C08K 2003/2234* (2013.01); *C08K 2201/011* (2013.01)

(58) Field of Classification Search
   CPC .... G21F 1/10; G21F 1/103; C08K 2003/2234
   See application file for complete search history.

(56) References Cited

U.S. PATENT DOCUMENTS

| | | | | |
|---|---|---|---|---|
| 3,858,050 A | * | 12/1974 | Carlson | G21F 5/02 250/515.1 |
| 3,976,889 A | * | 8/1976 | Noske | A61B 6/032 378/157 |
| 4,203,886 A | * | 5/1980 | Hirai | C08K 3/16 250/519.1 |
| 5,033,075 A | * | 7/1991 | DeMone | G21K 1/10 378/156 |
| RE44,036 E | | 3/2013 | McCord | |
| 9,475,263 B1 | | 10/2016 | Rangan et al. | |
| 9,745,442 B2 | * | 8/2017 | Kim | C08K 3/38 |
| 10,555,708 B2 | * | 2/2020 | Egolf | G21F 3/00 |
| 2020/0143951 A1 | | 5/2020 | Harris, Jr. et al. | |

FOREIGN PATENT DOCUMENTS

| | | |
|---|---|---|
| CN | 101451275 A | 6/2009 |
| CN | 109903871 A | 6/2019 |
| CN | 110517802 A | 11/2019 |
| JP | 62297359 A * | 12/1987 |

OTHER PUBLICATIONS

Machine translation of JP 62-297359, Dec. 24, 1987.*

* cited by examiner

*Primary Examiner* — Vickey Nerangis
(74) *Attorney, Agent, or Firm* — W & C IP

(57) ABSTRACT

A radiation shielding material is fabricated by providing a mixture of a polyester polymer and lead oxide. The material can be formed by the open mold cast technique. A nanocomposite material comprising at least 10% lead oxide is used to provide shielding for diagnostic or medium x-rays. A formulation comprising 40% of lead oxide nanofiller embedded in a polyester matrix performed best at attenuation of diagnostic and medium x-ray levels.

5 Claims, 19 Drawing Sheets
(19 of 19 Drawing Sheet(s) Filed in Color)

5A

5B

10A

10B

11A

11B

12A

12B

13C

13D

15A

15B

15C

15D

POLYESTER NANOCOMPOSITES FOR PROTECTION FROM HAZARDOUS RADIATION USED FOR MEDICAL APPLICATIONS

BACKGROUND OF THE INVENTION

Field of the Invention

The invention generally relates to nanocomposite materials suitable for radiation shielding. The invention further relates to methods for producing and using nanocomposite materials as shielding from ionizing radiation, particularly that used for radiology.

Background

Diagnostic radiology is a field of medicine where radiologists use non-invasive imaging scans to diagnose patients. Radiology uses techniques such as X-ray imaging in detecting and diagnosing diseases and injuries, managing the care of patients, and guiding many other forms of medical treatment. It is very important to have a periodic evaluation of doses and image quality in order to optimize the radiation protection of patients. The lowest dose of radiation possible is used to avoid or at least minimize the exposure of the patients while still achieving a diagnostic or therapeutic objective. Furthermore, it is a priority of diagnostic radiology to limit exposure of patients to radiation not only for the sake of protecting them, but to protect the radiologist, too. Awareness of radiological protection of the patients also provides occupational protection. Thus, hazardous ionizing radiation is a vital issue that requires significant actions and equipment for protection of workers and patients at medical centers.

Design of radiation shielding must consider of the problems with shielding materials before selecting the appropriate material to be used for shielding. The problems range from minor to complex ones where there might be severe side effects from the use of inappropriate shielding materials in medical radiation procedure rooms. These problems can be considered in terms of shielding performances with different shielding materials. In general, shielding materials do not totally absorb x- and gamma radiation, but the thickness of the shield can significantly reduce the radiation penetration. Constant monitoring of the dose rate is required to verify shielding performance of any material. Materials selection can be optimized when selection is made in conjunction with the requirements of a specific task, thus providing the greatest potential for weight or cost savings. The choice of materials requires consideration of a variety factors, including nuclear interaction, chemical interaction, heat transfer, structural characteristics, other physical properties, and economics, which must all be applied in a strictly monitored analysis.

Radiation exposure is of increasing concern to the scientific community owing to its growing applications ranging from power generation to medical uses. Ionizing radiation has significant roles in diagnostics and radiotherapy. Therefore, the benefits of using ionizing radiation for medical purposes supersede its potential risks to the human health. In this regard, there is need for radiation protection practices to ensure the radiation exposure to the occupational radiation exposure is regulated or kept as low as reasonably achievable (ALARA). To comply with the ALARA safety principle, the choice of shielding materials plays a significant role. A commonly used radiation shielding material to protect patients, radiation workers and the general public is simply a concrete wall. However, this traditional shielding material has several shortcomings, such as occupying unnecessary space and being completely opaque. Therefore, there is a need for flexible shielding materials with promising potential to protect the patient, radiation workers and members of the public from the harmful effects of radiation. In view of the above, there are already numerous efforts by scientific community to replace the use of concrete as shielding with polyester shielding materials including nanocomposite materials.

Nanocomposite materials are defined as materials consisting two or more nanoparticles components of different chemical and physical properties in which the resultant materials may exhibit a unique characteristic different from the individual component. Furthermore, the nanocomposites are typically developed to obtain stronger, less expensive and lighter materials, as compared to traditional materials, such as lead or concrete. The most common nanocomposites materials employed by numerous studies, with a view to replace the traditional shields, are polymer and glass composites. In particular, the physical properties of polymers make these materials more suitable because the polymer compositions are easy to modify through simple preparation techniques. Moreover, to improve the effectiveness of radiation shielding of polymers, they can be doped with heavy metals such as $MoO_3$, $WO_3$, $PbO$ and $Bi_2O_3$. For example, many studies reported that addition of $Bi_2O_3$ improves the shielding properties of the polymer due to its known gamma-ray shielding characteristics. In addition to these advantageous physical properties, polymers also exhibit high density, non-toxicity and ease of fabrication.

Advantageous properties of the polymer composite, such as the ease of preparation, durability, low density and other properties make polyester composites good shielding materials against ionized medical radiation. However, polyester composites are not sufficient on their own to stop high energy photons, for instance photons of gamma rays and x-rays. Various polyester composites are known, however, very few have been shown to be adequate for radiation protection, particularly protection from high energy photons. Therefore, a need exists for improved polyesters as shielding materials.

SUMMARY OF THE INVENTION

The invention is a nanocomposite material for shielding radiation from an x-ray and/or gamma radiation beam, comprising a polyester polymer and lead oxide ($Pb_3O_4$) nanopowder, wherein the lead oxide is present at a concentration of 10% to 50% by weight, and wherein the nanocomposite material is formed into a shape suitable for shielding and attenuating exposure from the x-ray and/or gamma radiation beam. In one embodiment, the nanocomposite material of claim 1, wherein the lead oxide concentration is in the range of 30% to 40%. In another embodiment, the nanocomposite material of claim 1, wherein the lead oxide concentration is 40%.

In one embodiment, the invention is a lead oxide/polyester nanocomposite material that is a sheet or plate. The sheet or plate may be joined to other sheets or plates to form an open surround or box around a device, a target, a medical instrument, a practitioner, a patient and/or a region or body part of a patient. The open surround or box may be two-sided, three-sided, or four-sided. In another embodiment, the invention can be applied to an existing structure or device.

In another embodiment, the invention is a method of fabricating a nanocomposite material for shielding radiation from an x-ray and/or gamma radiation beam, comprising the steps of preparing a solution of a polyester polymer in acetone with continuous stirring for at least 30 minutes to initiate polymerization, adding lead oxide ($Pb_3O_4$) nanopowder to obtain a concentration in the range of 10% to 40% by weight with continuous stirring until obtaining homogeneous solution, adding cobalt octoate as an accelerator to obtain a concentration of approximately 5% by weight and mixing for 5 minutes or until all components are homogenized, transferring the mixture into a plastic solid form of the desired size and shape, and allowing the mixture to air-dry and cure.

In one embodiment of the method, the lead oxide concentration is in the range of 30% to 40%. In another embodiment, the lead oxide concentration is 40%.

In yet another embodiment, the invention is a method of using a nanocomposite material for shielding radiation from an x-ray beam at diagnostic radiation energy levels and/or gamma radiation beam, comprising the steps of:

fabricating the nanocomposite material from a mixture of a polyester polymer and lead oxide ($Pb_3O_4$) nanopowder, wherein the lead oxide is present at a concentration of 10% to 40% by weight, and casting the mixture in a mold suitable for forming a nanocomposite shield, positioning the nanocomposite shield in a location that provides shielding and attenuation of radiation from an x-ray and/or gamma radiation beam. The invention is particularly appropriate for use in a medical setting, wherein the x-ray and/or gamma radiation beam comprises a diagnostic or therapeutic procedure. The application of the nanocomposite shield may be designed to protect a practitioner, a patient undergoing a treatment, or both. The application may also be designed to protect other individuals who may be in the area of the medical treatment, either as a participant or a bystander who might otherwise be subject to stray radiation.

Other features and advantages of the present invention will be set forth in the description of invention that follows, and in part will be apparent from the description or may be learned by practice of the invention. The invention will be realized and attained by the compositions and methods particularly pointed out in the written description and claims hereof.

BRIEF DESCRIPTION OF THE DRAWINGS

The patent or application file contains at least one drawing executed in color. Copies of this patent or patent application publication with color drawings will be provided by the Office upon request and payment of the necessary fee.

The accompanying drawings, which are incorporated in and constitute a part of this specification, illustrate embodiments of the invention and, together with a general description of the invention given above, and the detailed description given below, serve to explain the invention.

DETAILED DESCRIPTION

Figure 1A:
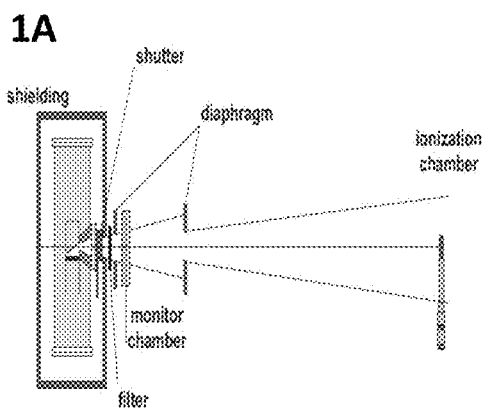
FIGS. 1A-1E show a diagram of the test setup in 1A, and various views of the apparatus for conducting the tests in 1B-1D. 1E shows a closer view of the external front panel control offered through the MP1 Datalog Controller withstand the optimum operating conditions of generator tube voltage.

The following descriptions and examples illustrate some exemplary embodiments of the disclosed invention in detail. Those of the skill in the art will recognize that there are numerous variations and modifications of this invention that are encompassed by its scope. Accordingly, the description of a certain exemplary embodiment should not be deemed to limit the scope of the present invention.

The invention is a lead oxide/polyester nanocomposite material comprising a polyester polymer and lead oxide ($Pb_3O_4$) nanopowder, wherein the lead oxide is present at a concentration of 10% to 50% by weight. The nanocomposite material is formed into a shape suitable for shielding and attenuating exposure from an x-ray and/or gamma radiation beam and is particularly suited to provide shielding during a medical procedure that involves the use of radiation. In one embodiment, the nanocomposite material of claim 1, wherein the lead oxide concentration is in the range of 30% to 40%. In another embodiment, the nanocomposite material of claim 1, wherein the lead oxide concentration is 40%.

As used herein, the terms "polymer nanocomposites" and "polyester nanocomposites" are used interchangeably to refer to the materials of the invention. The materials of the invention are also referred to as "lead oxide/polyester nanocomposites" and "lead oxide/polyester polymer nanocomposites" and these are all interchangeable.

In one embodiment, the invention is a lead oxide/polyester nanocomposite material that is a sheet or plate. The sheet or plate may be joined to other sheets or plates to form an open surround or box around a device, a target, a medical instrument, a practitioner, a patient and/or a region or body part of a patient. The open surround or box may be two-sided, three-sided, or four-sided. In another embodiment, the nanocomposite material is formed using an injection mold to produce a specific shape that fits over or around a device used to administer a radiological medical procedure. For example, a shield may be formed to surround a brachytherapy device to shield the patient and/or practitioner from the radiation source until the device is deployed and the radiation source is directed to an intended target area. In other embodiments, the sheets or plates function as a panel that shields a portion of a room, a device, or any other region where shielding is needed. In another embodiment, the invention can be applied to an existing structure or device.

In another embodiment, the invention is a method of fabricating a nanocomposite material for shielding radiation from an x-ray and/or gamma radiation beam, comprising the steps of:

preparing a solution of a polyester polymer in acetone with continuous stirring, adding lead oxide ($Pb_3O_4$) nanopowder to obtain a concentration in the range of 10% to 40% by weight with continuous stirring until obtaining homogeneous solution, adding an accelerator to obtain a concentration of approximately 5% by weight and mixing for 5 minutes or until all components are homogenized, transferring the mixture into a plastic form of the desired size and shape, and allowing the mixture to air-dry and cure. The air-drying and curing may be carried out at room temperature.

In one embodiment of the method, the lead oxide concentration is in the range of 30% to 40%. In another embodiment, the lead oxide concentration is 40%. The accelerator may be cobalt octoate.

In yet another embodiment, the invention is a method of using a nanocomposite material for shielding radiation from an x-ray and/or gamma radiation beam, comprising the steps of:

fabricating the nanocomposite material from a mixture of a polyester polymer and lead oxide ($Pb_3O_4$) nanopowder, wherein the lead oxide is present at a concentration of 10% to 50% by weight, and casting the mixture in a mold suitable for forming a nanocomposite shield, positioning the nanocomposite shield in a location that provides shielding and attenuation of radiation from an x-ray and/or gamma radiation beam. The invention is particularly appropriate for use in a medical setting, wherein the x-ray and/or gamma radiation beam comprises a diagnostic or therapeutic procedure. The application of the nanocomposite shield may be designed to protect a practitioner, a patient undergoing a treatment, or both. The application may also be designed to protect other individuals who may be in the area of the medical treatment, either as a participant or a bystander who might otherwise be subject to stray radiation.

The polyester nanocomposite can be formed from a composite mixture by emulsion polymerization, solution polymerization or bulk polymerization. Radical initiation or anionic polymerization can also be performed. The nanocomposites of the invention may be fabricated using any of the techniques that are well-known in the art, including open mold casting, injection molding, compression molding and extrusion. While the nanocomposite may be molded into any specific shape that is desired, in one embodiment the material is formed as a sheet or plate. These sheets or plates may be joined using a cyanoacrylate cement, or with heat or welding. Chlorinated solvents, such as dicloromethane or trichloromethane may also be used. Chlorinated solvents dissolve the polyester at the points where a joint is desired, which then fuses and sets, forming an almost invisible weld between two sheets or pieces of any shape.

The thickness of the nanocomposite material can be varied according to a desired application. Coatings in the ranges of 0.2 to 20 cm can be used for various application. For example, for shielding from x-ray radiation, the estimated thickness of the nanocomposite that totally absorbs radiation will typically be in the range of 0.2 to 0.6 cm for a diagnostic x-ray generator of tube voltage 40 V.

When applied as a coating on walls of medical centers the thickness of the nanocomposite material can be varied according to a desired application. Typical applications include but are not limited to mammogram, x-ray dentistry, general x-ray and computed tomography. For example, for shielding from x-ray radiation (tube voltage 40 kV) the thickness of the $Pb_3O_4$/nanocomposite will typically be in the range of 0.4 to 2 cm, and in other cases will be in the range of 0.2 to 0.6 cm, and for shielding from medium x-ray (120 kV) the thickness of the nanocomposite will typically be in the range of 6 to 15 cm. In some applications for shielding from medium x-ray, a thicker nanocomposite may be used, typically in the range of 11 to 20 cm. The coating may be applied to a single surface of other materials, or it may be applied to more than one surface.

Among the polymers to be considered for use are polyesters, which are very important and frequently used polycondensation polymers. The word polyester is often used to refer to polyethylene terephthalate (PET), even though there are many other polyesters. Polyesters are usually produced from dicarboxylic acids and diols but may occasionally comprise other acids. Polyester is classified based on the presence of a functional ester group on a polymeric main-chain. One can form polyester polymers by reacting multiple molecules and covalently linking them together by ester linkages. Polyester is mainly grouped into two which are thermoset (unsaturated polyester, polyester resin) and thermoplastic polyesters. Furthermore, thermoplastics can be sub-grouped as linear aromatic polyesters (fiber- and film-forming polyesters), elastomers (block copolyesters), liquid crystal polyester, engineering plastics, aliphatic polyesters, and poly (hydroxyl alkanoates). Novolac, which is a condensation polymer of phenol and formaldehyde, is an example of thermosetting polymer. Some of these polymers may include polylactic acid, which is polymerized lactic acid sourced from foods like cassava and corn, resulting in a polylactic type of biocompatible polyester. Polycaprolactone is another type of polyester, wherein 3-caprolactone is polymerized in a method called ring-opening. It is then passed under the influence of catalyst resulting in a semi-crystalline polyester. As a solution, polymers with positive functional groups are combined with polycaprolactone chemically and supply the missing cations, thus forming cationic amphiphiles. This polyester is also a biodegradable polyester. Another polyester type is polylactic-coglycolic acid which has advantageous properties like biocompatibility, biodegradability, nontoxicity in nature. Its constituent is simply an ester connecting lactic and glycolic acid. Its commercial applications depend on the ratio of lactic acid and glycolic acid present forming the resulting polylactic-co-glycolic acid which can be used in plastic making. Pharmaceutical industries also use them because they are easy to handle and possess other unique properties. The three aforementioned polyesters are termed traditional polyesters. There are other nontraditional polyesters that include polyhydroxyalkanoates which are used as drug carriers; they are deposited by bacteria as carbon. Also, there exists the polyester dendrimer and the polybutylene adipate. It is important to mention the origination of polyesters as regards abnormality of branched polymers. These polymers include star polymers, which are described from the structure of a star having a center point where the branching occurs as linear chains grow. The number of arms/chains coming out of this center point will determine the function of the polymer. Another type, known as graft polymers, always have main chains with the arms of the chain connecting to the arm of another main chain, all of which vary in chemical constituents. Comb polymer is indirectly a graft polymer as arms/chains leave their main chain at the point where it is branched. That is, a chain emerges and leaves the branch portion on a proper chain. In general, if the polymer formed has complex structure, it will be called graft polymer. Hyperbranched and dendritic polymers have similarity in both the end structures of the branch points which are nested in nature. The difference in their shapes is that the hyperbranched has random joining chains wherein some of the chains look alike. For the dendritic polymers, the shape is like a cascade with a regular appearance.

Before exemplary embodiments of the present invention are described in greater detail, it is to be understood that this invention is not limited to any particular embodiment described herein and may vary. It is also to be understood that the terminology used herein is for the purpose of describing particular embodiments only, and is not intended to be limiting, since the scope of the present invention will be limited only by the appended claims.

Where a range of values is provided, it is understood that each intervening value between the upper and lower limit of that range (to a tenth of the unit of the lower limit) is included in the range and encompassed within the invention, unless the context or description clearly dictates otherwise. In addition, smaller ranges between any two values in the range are encompassed, unless the context or description clearly indicates otherwise.

Unless defined otherwise, all technical and scientific terms used herein have the same meaning as commonly understood by one of ordinary skill in the art to which this invention belongs. Representative illustrative methods and materials are herein described; methods and materials similar or equivalent to those described herein can also be used in the practice or testing of the present invention.

All publications and patents cited in this specification are herein incorporated by reference as if each individual publication or patent were specifically and individually indicated to be incorporated by reference, and are incorporated herein by reference to disclose and describe the methods and/or materials in connection with which the publications are cited. The citation of any publication is for its disclosure prior to the filing date and should not be construed as an admission that the present invention is not entitled to antedate such publication by virtue of prior invention. Further, the dates of publication provided may be different from the actual dates of public availability and may need to be independently confirmed.

It is noted that, as used herein and in the appended claims, the singular forms "a", "an", and "the" include plural referents unless the context clearly dictates otherwise. It is further noted that the claims may be drafted to exclude any optional element. As such, this statement is intended to serve as support for the recitation in the claims of such exclusive terminology as "solely," "only" and the like in connection with the recitation of claim elements, or use of a "negative" limitations, such as "wherein [a particular feature or element] is absent", or "except for [a particular feature or element]", or "wherein [a particular feature or element] is not present (included, etc.) . . . ".

As will be apparent to those of skill in the art upon reading this disclosure, each of the individual embodiments described and illustrated herein has discrete components and features which may be readily separated from or combined with the features of any of the other several embodiments without departing from the scope or spirit of the present invention. Any recited method can be carried out in the order of events recited or in any other order which is logically possible.

EXAMPLES

The following Examples provide exemplary designs and methods for fabricating and using polyester nanocomposites of the invention. These Examples describe materials and methods for using embodiments illustrated in FIGS. 1-11. Additional details found in the figures can be found in the section entitled "Brief Description of the Drawings".

The invention provides radiation shielding fabricated using polyester/lead oxide nanocomposites suitable for use with two different x-ray tube types: a diagnostics x-ray (40-250 kV) and a medium energy (120-250 kV). Polyester nanocomposites were fabricated by embedding various concentrations of lead oxide ($Pb_3O_4$) nanopowder, including 10%, 20%, 30% and 40% by weight. The nanopowder is mixed with polyester matrix in a liquid solution.

Polyester nanocomposite shields in the following Examples were prepared using open mold cast technique. Physical properties of all samples were demonstrated using various techniques including x-ray diffraction (XRD), scanning electron microscope (SEM) and Transform Infrared Spectroscopy (FTIR). The linear attenuation coefficient (LAC) was measured using narrow beam technique for each of the aforementioned tubes. Half value layer (HVL) of the samples were computed from linear attenuation coefficients.

Example 1

Formulation of Nanocomposites and Experimental Design for Testing

Polyester (PE) liquid polymers of high-quality raw materials with high transparency was purchased locally. Lead oxide ($Pb_3O_4$) powder bought from SUVCHEM (Mumbai, India), was used. Solution-casting method is used for the fabrication of the $Pb_3O_4$/Polyester coating nanocomposites in the following Examples. The first step involved the calculation and measurement of the required weight fractions for a desired composite. Different weight percentages ranged from 0% to 40% of nano-powdered lead oxide were added to the mixture and using magnetic stirrer hot plate (at room temperature) for 1 hour to ensure homogeneity in prepared sample. The solution may be an aqueous solution and may further comprise acetone, a ketone or an alcohol. Proper curing or hardening are facilitated by adding acetone as initiator and accelerator agents. Acetone or methyl ethyl ketone peroxide can be used as initiator, which is added before $Pb_3O_4$, and cobalt octoate (5%) is added after $Pb_3O_4$ as accelerator. This begins the cross-linking process that bonds the polymer chains until the mixture forms a gel and then hardens. At the end of the stirring process the solution mixture is ultimately cast into a glass Petri dish and left for slow drying in air to obtain the film sample. The formulations with their different weight fractions of their compositions are shown in Table 1.

TABLE 1

Percentage weight fractions of polymer composite formulations.

| Symbol | Weight percentage | | Thickness | Density |
| --- | --- | --- | --- | --- |
| | Polyester | $Pb_3O_4$ | (mm) | (g/cm$^3$) |
| PE0 | 100 | 0 | 2.71 | 1.42 |
| PE10 | 90 | 10 | 2.45 | 1.45 |
| PE20 | 80 | 20 | 2.10 | 1.53 |
| PE30 | 70 | 30 | 3.51 | 1.60 |
| PE40 | 60 | 40 | 1.82 | 1.68 |

An Ultima IV x-ray diffractometer was used to determine the structural changes of the polymer composites due to the addition of nanofillers (Rigaku Co; Japan). Cu Kα line of wavelength 1.54060 Angstrom and operating conditions 40 kV/20 mA were selected for XRD investigation. The scanning range started at 2θ=20o up to 90o with step 0.02o. The polymer composites were examined by x-rays to know the x-ray diffraction patterns through these materials. This technique enables the identification of the presence of crystalline phases in these materials.

Scanning electron microscope (SEM) is a very useful tool for demonstrating the microscopic feature of material surfaces. The surfaces of the fabricated samples were investigated using a JSM-7600F Schottky field emission scanning electron microscope (JEOL; Tokyo, Japan). The polymer composites were platinum-coated to avoid unnecessary charging of the samples during the imaging process, which is needed to acquire sharp images of the samples during the scanning process. Energy dispersive spectroscopy (EDS) analysis is enabled by an attachment to the SEM machine (Oxford Instruments; UK).

Fourier transform infrared spectroscopy (FTIR) provides a convenient tool by which reaction success is qualitatively evaluated and was used to investigate the chemical structure and the bonding between the polymer matrix and the fillers with a Nicolet iS10 FTIR spectrometer (ThermoFisher Scientific; Waltham Mass., USA). FTIR spectra of the polymer composites were recorded within the range of 400-4000 cm$^{-1}$.

Electrical and dielectric properties of the polyester nanocomposites were evaluated using a Keithly® 2400 SCM (Tektronix; Beaverton Oreg., USA) and a HIOKI-RLC Bridge (HIOKI E.E. Corporation; Nagano, Japan). Shielding was tested using two X-ray tubes manufactured by Varian Medical Systems (Date of manufacture February 2013) in the following Examples of the invention (Palo Alto Calif., USA). The first tube type, NDI-160-22, is utilized for x-ray diagnostic applications and the second type, NDI-320-26, is for medium x-ray applications and for radiation protection. Selected features of these two tube types are summarized in Table 2.

TABLE 2

Features of X-ray tubes utilized in the Examples of the invention

| Feature | Diagnostic X-ray (NDI-160-22) | Medium X-ray (NDI-320-26) |
| --- | --- | --- |
| Max Voltage (kV) | 160 | 320 |
| Power | 640 W; 3 kW | 1.5 kW; 4.2 kW |
| Inherent filter | 0.8 mm Be | 4 mm Be |
| Focal Spot (SM/LG) | D = 1; D = 5.5 | D = 3; D = 5.5 |

Figure 1B:
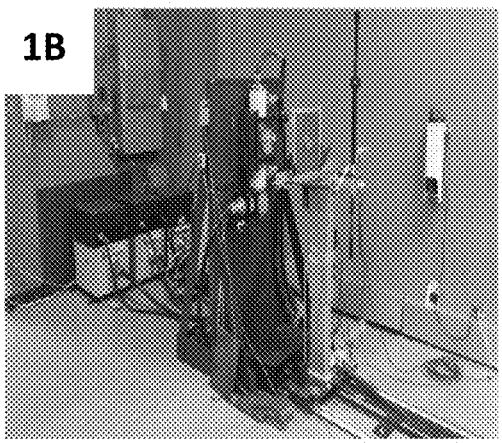
Figure 1C:
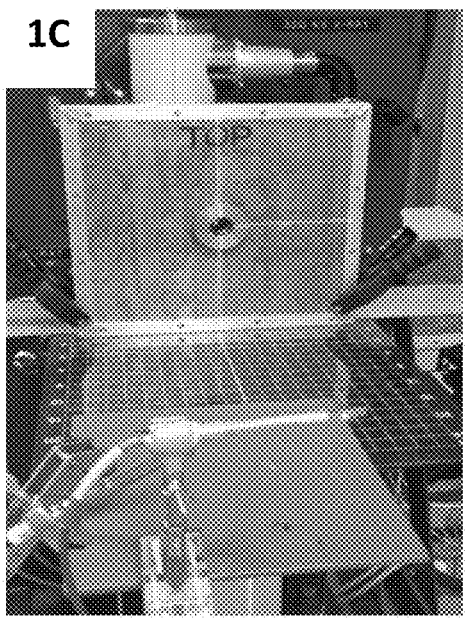
Figure 1D:
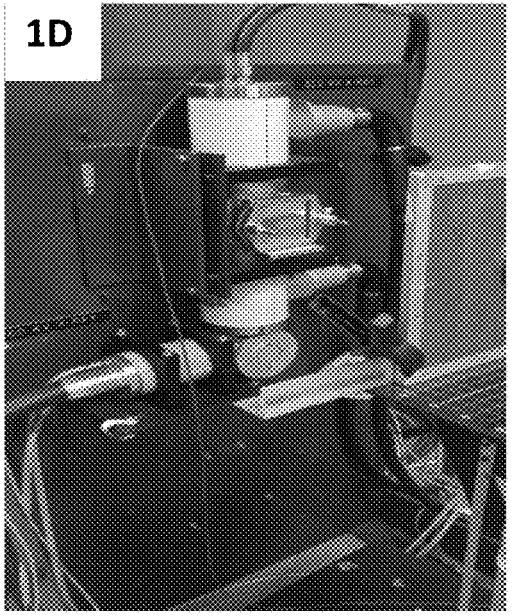
Figure 1E:
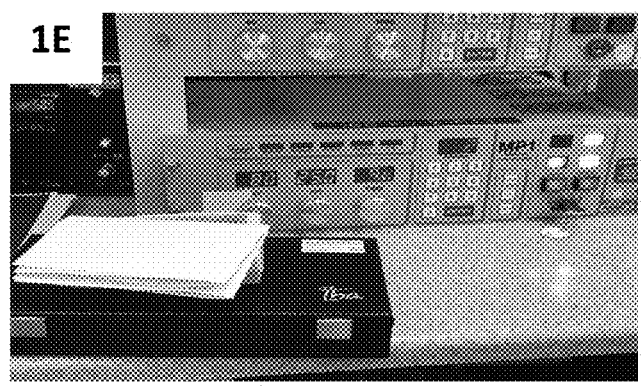

The x-ray tube is equipped with an MCN-321 bipolar with a fine focus (1.2 mm×1.2 mm) and a standard focus (4.0 mm×4.0 mm). It has a tungsten anode with a 20° target angle and an inherent filtration of 0.8 mm of beryllium. The setup for the x-ray generator was determined according to TRS No. 469 of the International Atomic Energy Agency (IAEA), as shown in FIGS. 1A-1E. FIG. 1A shows a diagram of the path of radiation, which was generated in an ionization chamber, from which radiation was directed through a pair of diaphragms, through a filter and shutter, into a monitor chamber surrounded by shielding. FIG. 1B shows a view of the overall setup. FIG. 1C shows a closer view showing an outer diaphragm through which a beam of radiation was guided by projection of green lights intersecting on an outer plate of the monitor chamber. FIG. 1D shows a closeup view of the proximal holder which the polyester nanocomposite materials were clamped. FIG. 1E shows a closer view of external control that is offered through the MP1 Controller. The attenuation properties in the following Examples of the invention were determined by measuring the ionization current with and without the samples, using a spherical ionization chamber (Exradin A4 #144; Standard Imaging, Inc; Middleton Wis., USA) and a UNIDOS Webline electrometer (PTW; Freiburg, Germany) was used. The electrometer was connected to the ionization chamber to collect the charge generated inside its cavity. The chamber was polarized at +400 V. For accurate measurements using thermometers and barometers, data acquisition was made using an Env-Coll 2012 2T/4T (Titon, Hungary), comprising probes for temperature, pressure, and humidity. The Unidos Webline electrometer associated with the Env-Coll appliance are connected to a computer. Webline DUO data acquisition software was used to collect measurements and perform the necessary calculations and temperature/pressure corrections with greater measurement accuracy.

To reduce the amount of scattered radiation, an ancillary collimator was positioned midway between the ionization chamber and the X-ray tube. The collimator was used to limit the shape, size, and direction of the X-ray beams. This collimator, made of lead having an area of 35 cm$^2$, a thickness of 8 mm and a circular hole with a diameter of 5 cm, produced an 8.4 cm diameter flattened field size at the reference distance of 100 cm from the focal spot. Since some of the samples had small dimensions, an additional collimator with a diameter of 2 cm was added to ensure that all samples were irradiated uniformly with a very narrow beam.

Mean energy E is given by:

$$E = \frac{\int_0^{E_{max}} \varphi_E E dE}{\int_0^{E_{max}} \varphi_E dE} \tag{1}$$

where φ E is the fluence derivative of the primary photons of energy E with respect to energies between E and E+dE and is written as:

$$\varphi_E = \frac{d\varphi_E}{dE} \quad (2)$$

Homogeneity of X-ray beam is the ratio between the HVL1 to the HVL2. SSDL proposed a finite value of X-ray beam HVLs at each beam quality for both medium and low X-ray, as shown in Tables 3 and 4. Tables 3 and 4 also summarize various beam qualities selected for the diagnostic x-ray and medium x-ray ranges for calibration according to the Secondary Standard Dosimetry Laboratory (SSDL), which provides calibration standards for the industry.

TABLE 3

Optimum RQR beam qualities obtained at SSDL for diagnostic X-ray (low energy).

| Beam Quality | Tube Voltage (cV) | Additional filters AI (mm) | First HVL in AI (mm) | Homogeneity coefficient % | Mean Energy (keV) | FCD/Diameter of beam (cm) |
|---|---|---|---|---|---|---|
| RQR2 | 40 | 2.33 | 1.428 | 81 | 27.03 | 100/8.2 |
| RQR6 | 80 | 2.51 | 3.01 | 69 | 41.64 | 100/8.2 |
| RQR10 | 150 | 3.3 | 6.57 | 72 | 66.56 | 100/8.2 |

TABLE 4

Optimum N Beam qualities obtained at SSFL for medium energy X-ray

| Beam Quality | Tube Voltage (kV) | Additional Filters | | | Mean Energy (keV) |
|---|---|---|---|---|---|
| | | Pb (mm) | Sn (mm) | Cu (mm) | |
| N-120 | 120 | — | 1 | 5 | 100 |
| N-150 | 150 | — | 2.5 | — | 118 |
| N-200 | 200 | 1 | 3 | 2 | 165 |
| N-250 | 250 | 3 | 2 | — | 207 |

Transmission factor is represented by relative relation $I_t/I_o$ where $I_o$ represents the incident x-ray beam intensity. It is the transmitted x-ray beam intensity at aforementioned diagnostic x-ray and medium energy tubes. Transmission factor is equal to 1 when there is only a line beam without shield in the path of x-ray beam. However, the transmission factor decreases when there is increasing $Pb_3O_4$ content. The Lambert-Beer law describes attenuation of a monoenergetic photon when it transmits through any medium of thickness t, as stated in:

$$\mu = \frac{1}{t}\ln\left(\frac{I_o}{I_t}\right) \quad (3)$$

where $I_o$ represents the incident intensity, p is the density of the glassy composite, μ is the linear attenuation coefficient and $I_t$ is the transmitted intensity.

HVL is the thickness of any substance, where one half of the radiation intensity incident on it is removed and the formula representing this property.

Example 2

XRD Results

Figure 2:
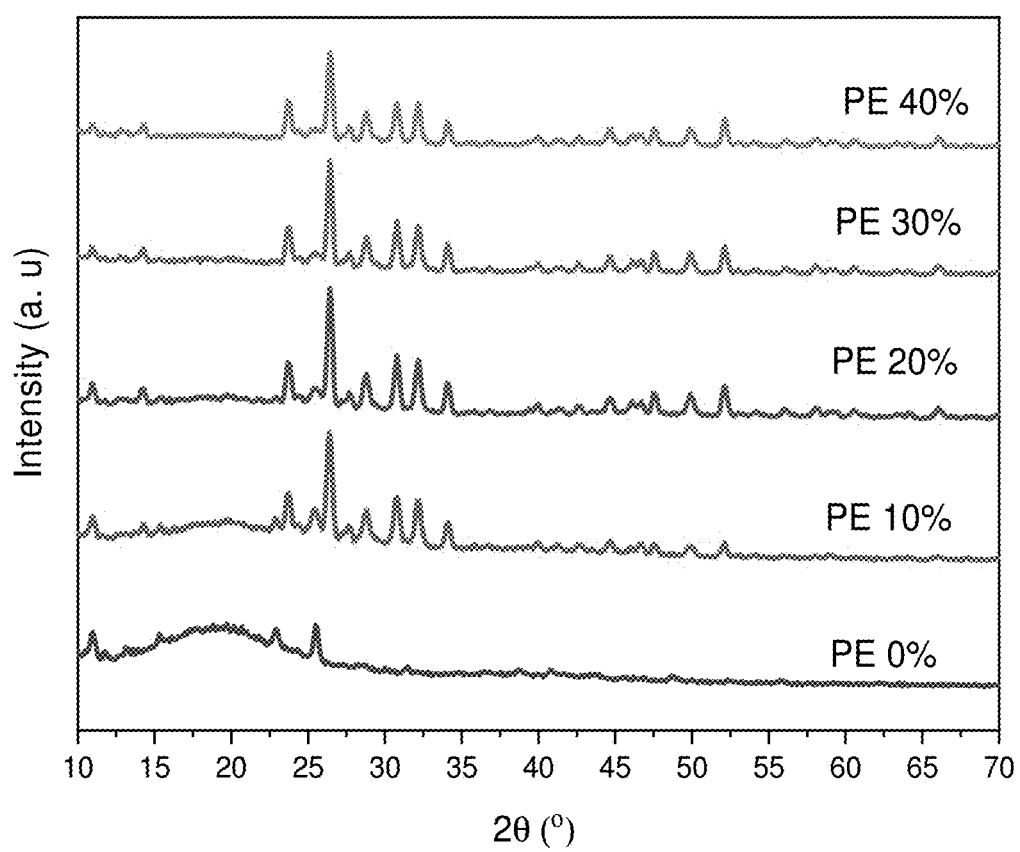
FIG. 2 shows the x-ray diffraction (XRD) of pure polyester (PE0) compared to 10, 20, 30 and 40 wt % of lead oxide embedded in polyester polymer nanocomposites, labeled as PE10, PE20, PE30 and PE 40, respectively.
Figure 3A:
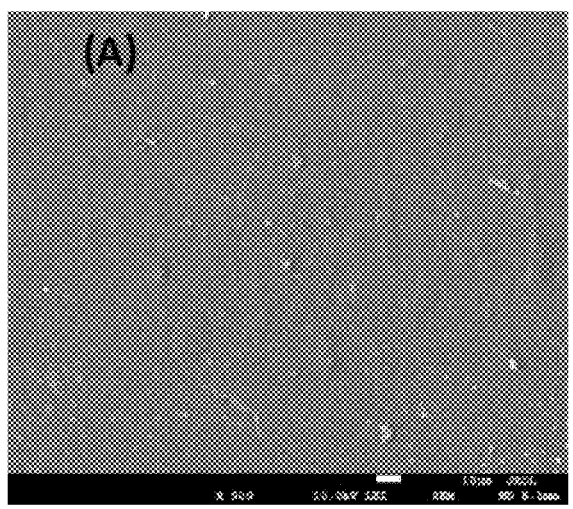
FIGS. 3A-3D show representative scanning electron microscopy (SEM) images of pure polyester or polyester nanocomposites having three different concentrations of $Pb_3O_4$, as described for FIGS. 2. 3A shows PE0; 3B shows PE10; 3C shows PE30; and 3D shows PE40.
Figure 3B:
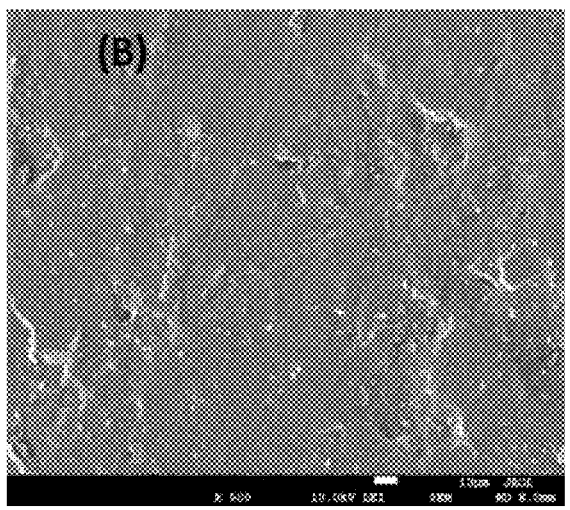
Figure 3C:
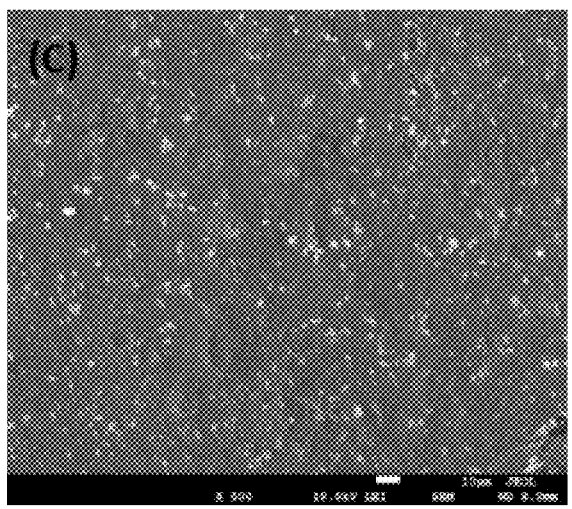
Figure 3D:
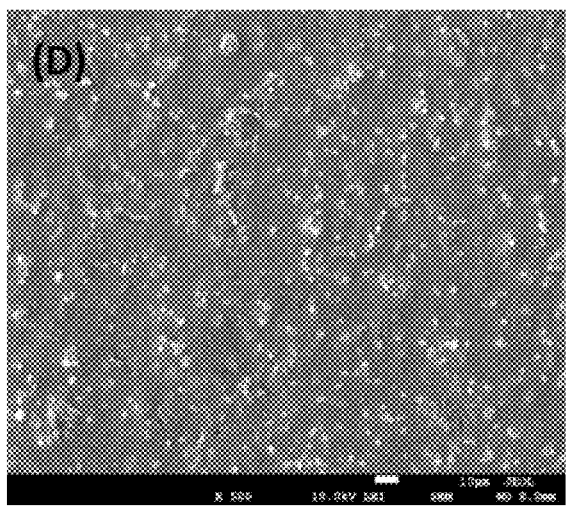
Figure 4A:
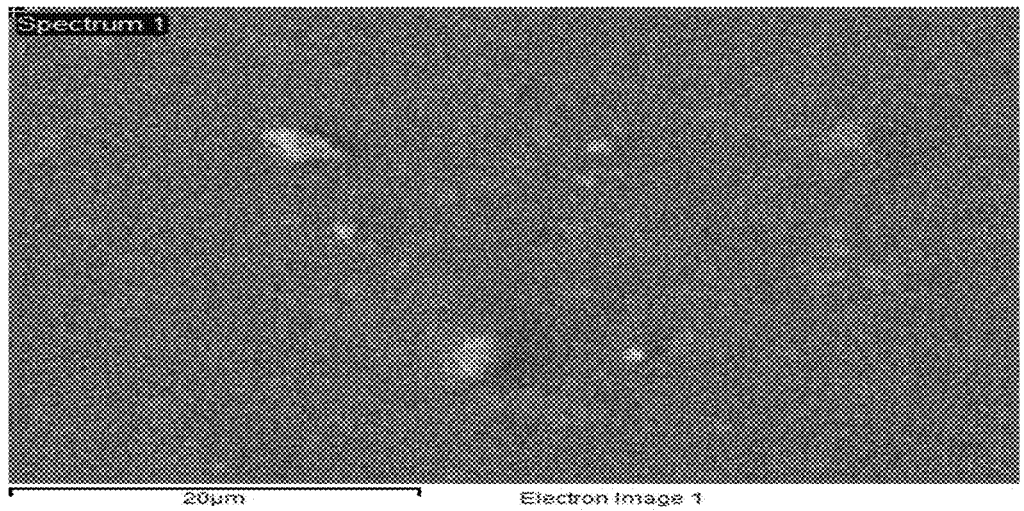
FIGS. 4A and 4B show a representative SEM image and an energy dispersive spectroscopy, (EDS) image, respectively, for PE0.
Figure 4B:
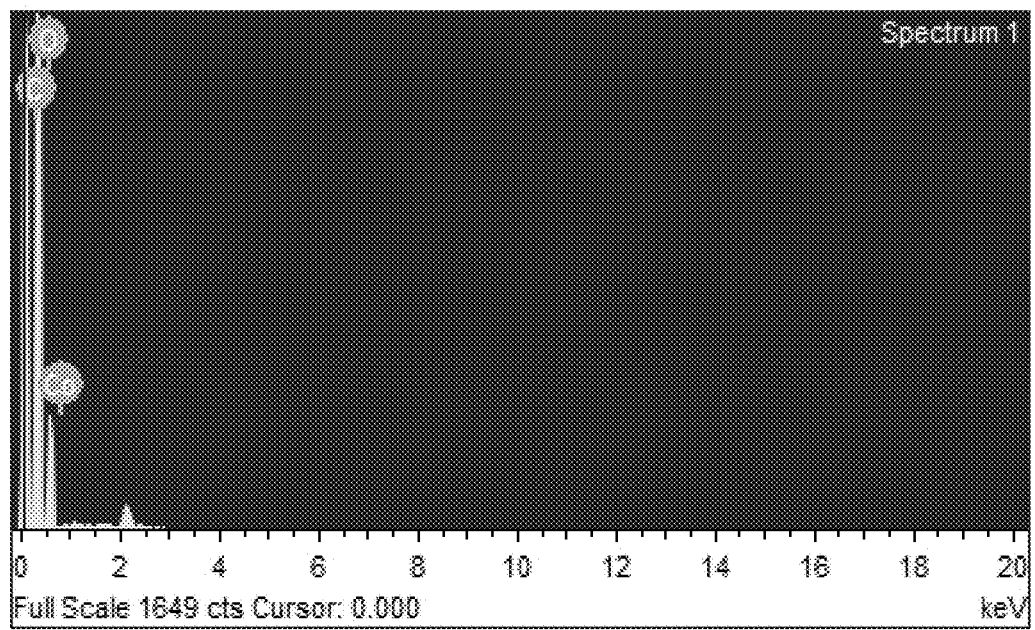

FIG. 2 shows the x-ray diffraction spectra of pure polyester and $Pb_3O_4$/polyester composites comprising various percentages of $Pb_3O_4$ nanopowder by weight. The tetragonal structure of pure $Pb_3O_4$ nanostructure appeared at peaks of 66.02°, 60.56°, 59.33°, 58.07°, 56.02°, 52.10°, 49.58°, 47.54°, 46.07°, 44.59°, 39.90°, 34.08°, 32.13°, 30.81°, 28.68°, 26.38° and 14.22° and are matched with JCPDS (Card No. 76-1799). The Scherrer equation, a formula that relates the size of sub-micrometer crystallites in a solid to the broadening of a peak in a diffraction pattern, and the W-H method, which is well-known in the art as an analysis used to estimate average crystal size. were utilized to evaluate average crystallite size. In the left-hand section of FIG. 2, 2θ=10 to 2θ=30°, the XRD results all correspond to semi-crystalline polyester.

Crystallite size of lead oxide nanopowder was found to be around 22 nm and this structure was preserved in the polyester composite, as measured in Example 2 and shown in FIG. 3. The peak observed at around 26.38° of nanopowder is at high intensity, in agreement with the lead oxide/polyester nanocomposite and also in accordance with Example 3, as shown in FIGS. 4 to 8. All the peaks shown for the spectra of these composites agree with the JCPDS NO:96-901-2125. The XRD spectra of these composites show the co-existence of lead oxide phase in the lead oxide/polyester nanocomposites. It could also be observed that the XRD peaks are an accurate indication of the percentage fraction of the fillers used for each composite, where a lower peak corresponds with a lower percentage fraction and a higher peak corresponds with a higher percentage. The average particle size of the fillers was determined from the peaks using the Scherrer formula. The average size of the filler particles was found to be 21 nm. This finding confirms that the fillers used in this Example were in fact nano-sized in all samples.

Example 3

Analysis of Polymer Nanocomposite Materials Using SEM.

SEM images of the pure polyester and lead oxide/polymer nanocomposites were acquired and analyzed. FIG. 3A-3D shows representative SEM images of polymer nanocomposites (3A, PE0; 3B, PE10; 3C, PE30; and 3D, PE40). The images shown in this figure illustrate the uniform distribution of nanofillers in the polyester matrix that was observed. The images were obtained using different magnifications so that more features of the morphology and distribution of the nanofiller (lead oxide) within the polymer matrix could be seen. A uniform distribution of the fillers was observed because of their small particle sizes and compatibility with the matrix. The white patches shown in the images represent the dispersal of nanofillers.

Example 4

Analysis of Polymer Nanocomposite Materials Using EDS.

Figure 5A:
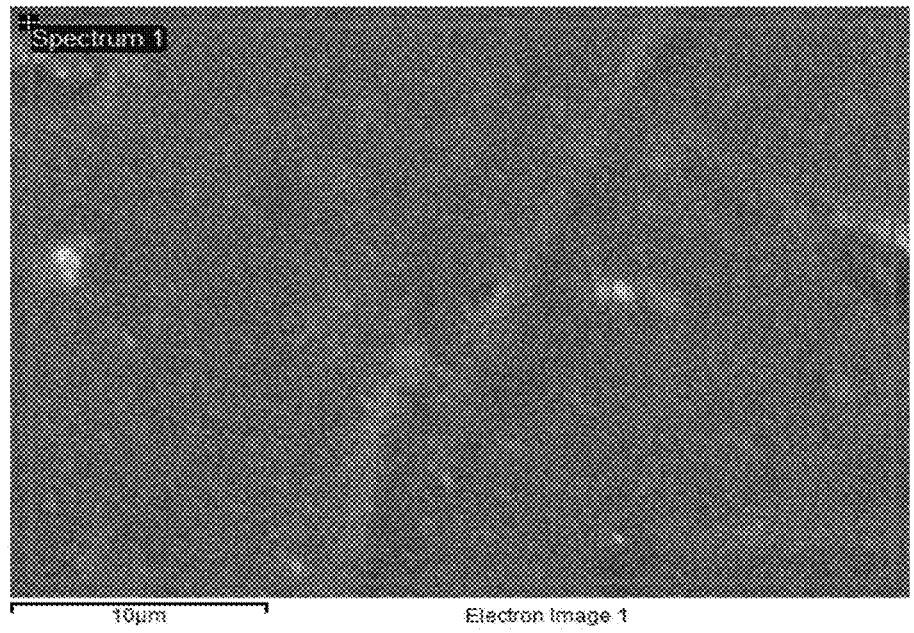
FIGS. 5A and 5B show a representative SEM image and an energy dispersive spectroscopy, (EDS) image, for PE10.
Figure 5B:
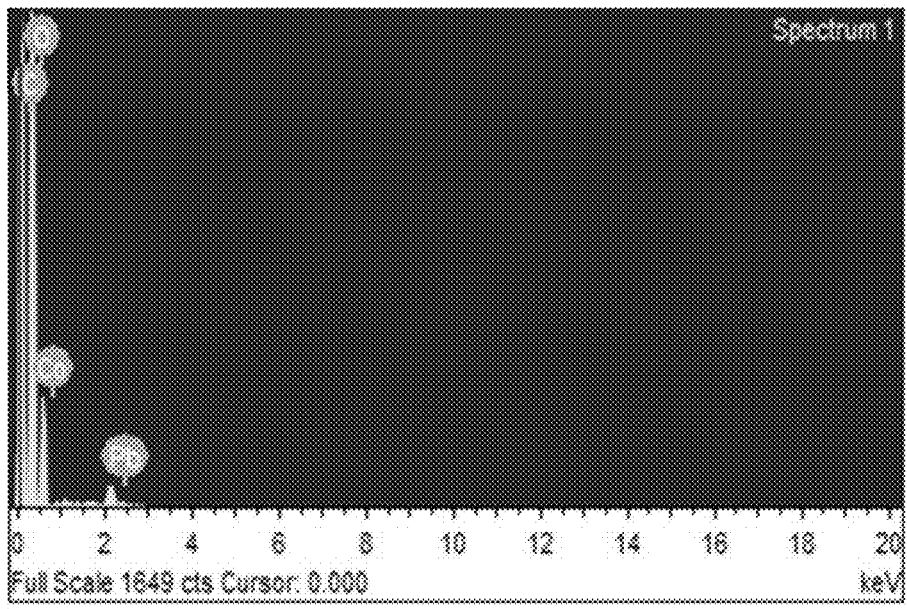
Figure 6A:
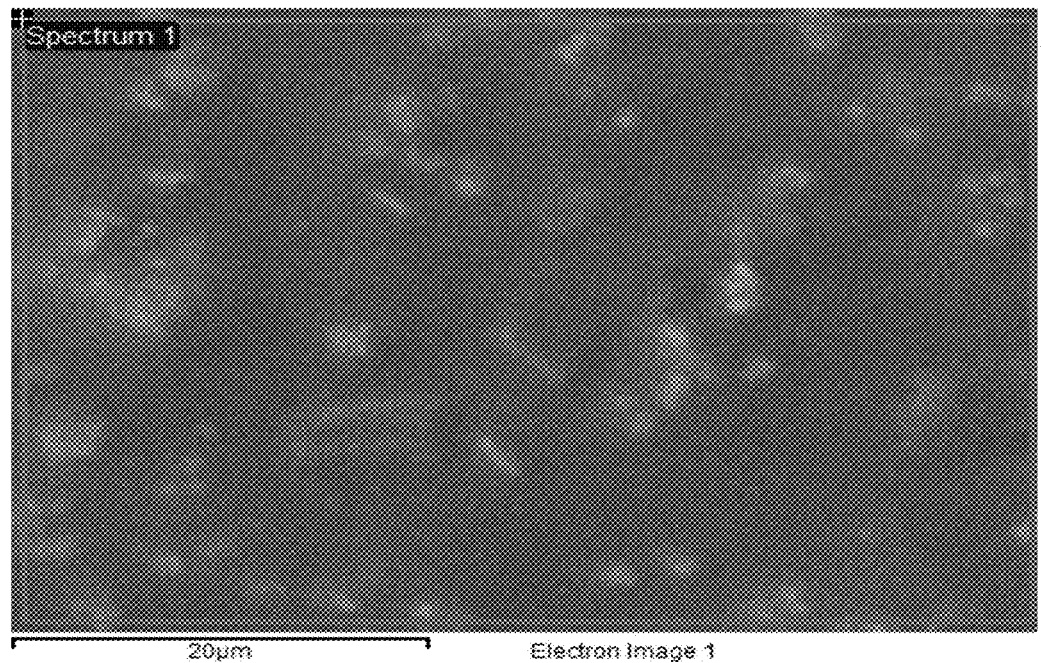
FIGS. 6A and 6B show a representative SEM image and an energy dispersive spectroscopy, (EDS) image, for PE20.
Figure 6B:
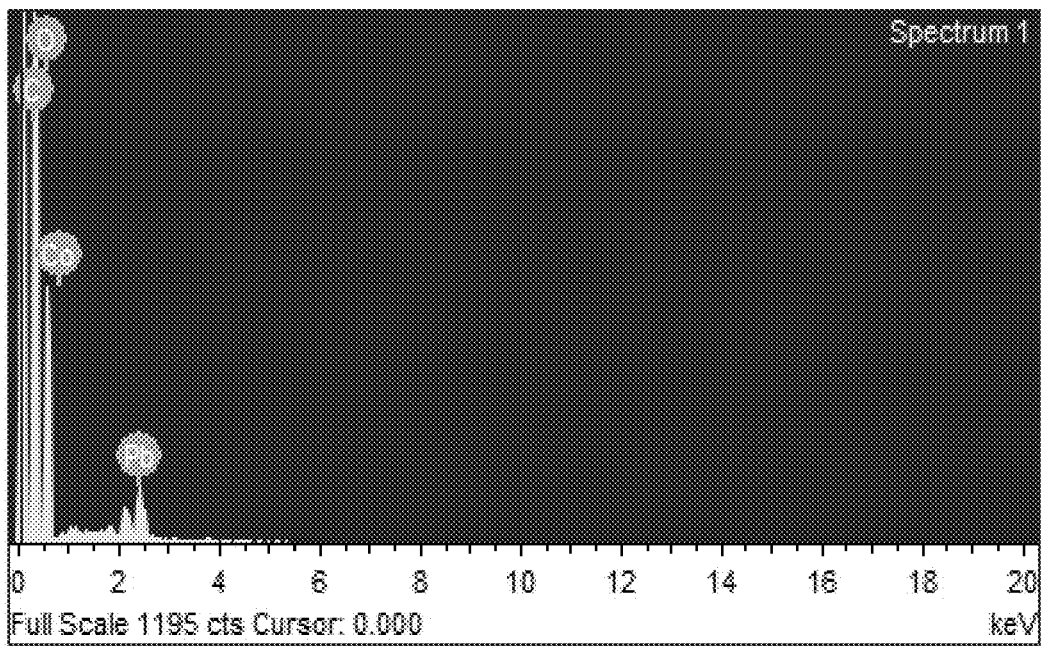
Figure 7A:
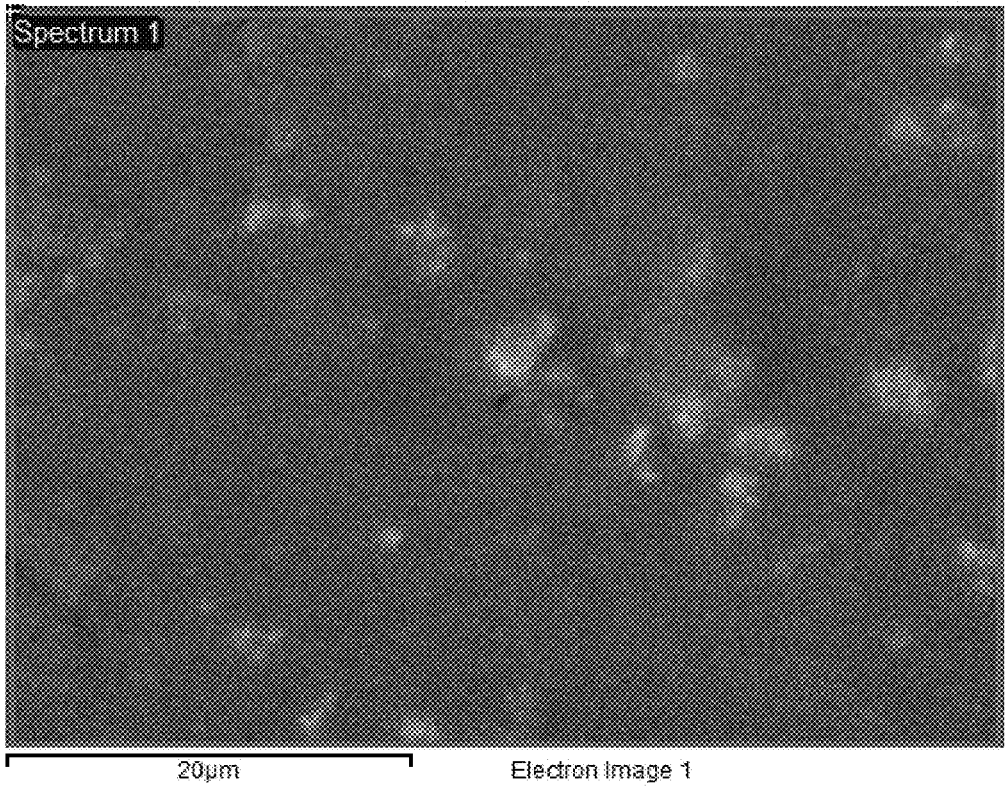
FIGS. 7A and 7B show a representative SEM image and an energy dispersive spectroscopy, (EDS) image, for PE30.
Figure 7B:
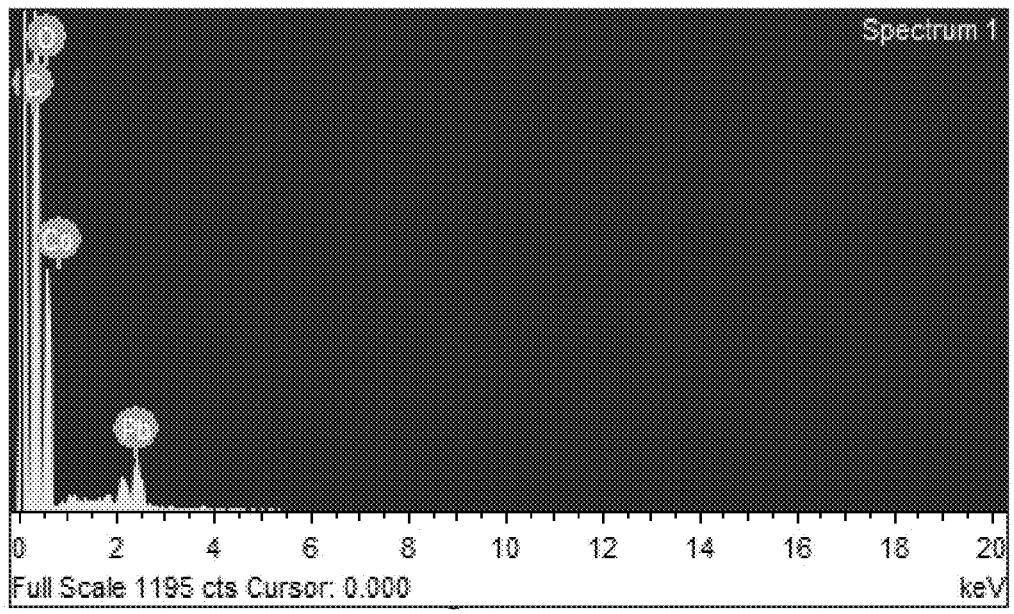
Figure 8A:
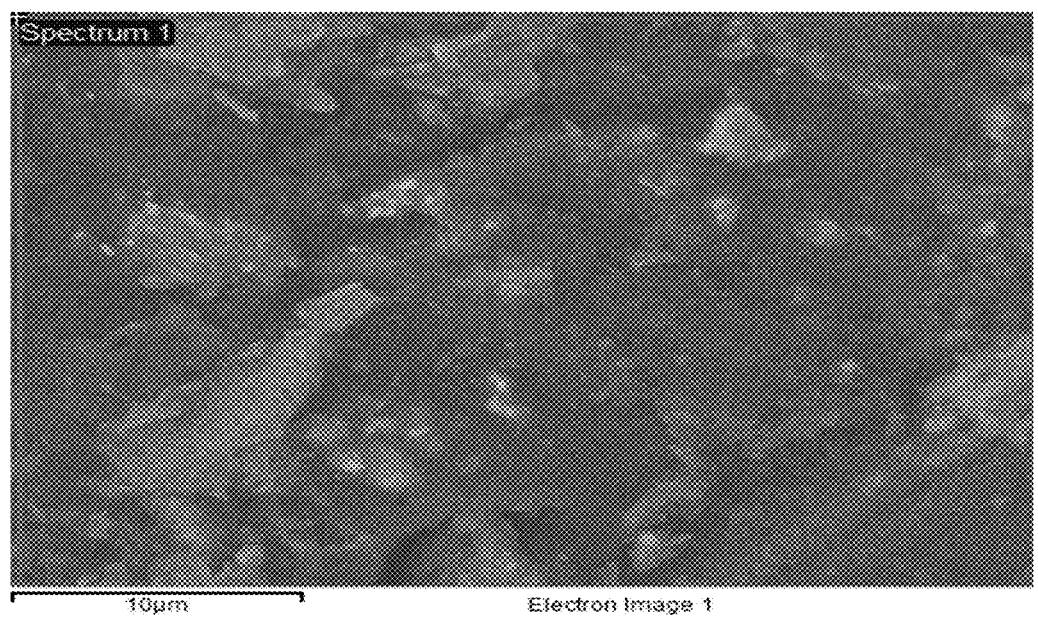
FIGS. 8A and 8B show a representative SEM image and an energy dispersive spectroscopy, (EDS) image, respectively, for PE40.
Figure 8B:
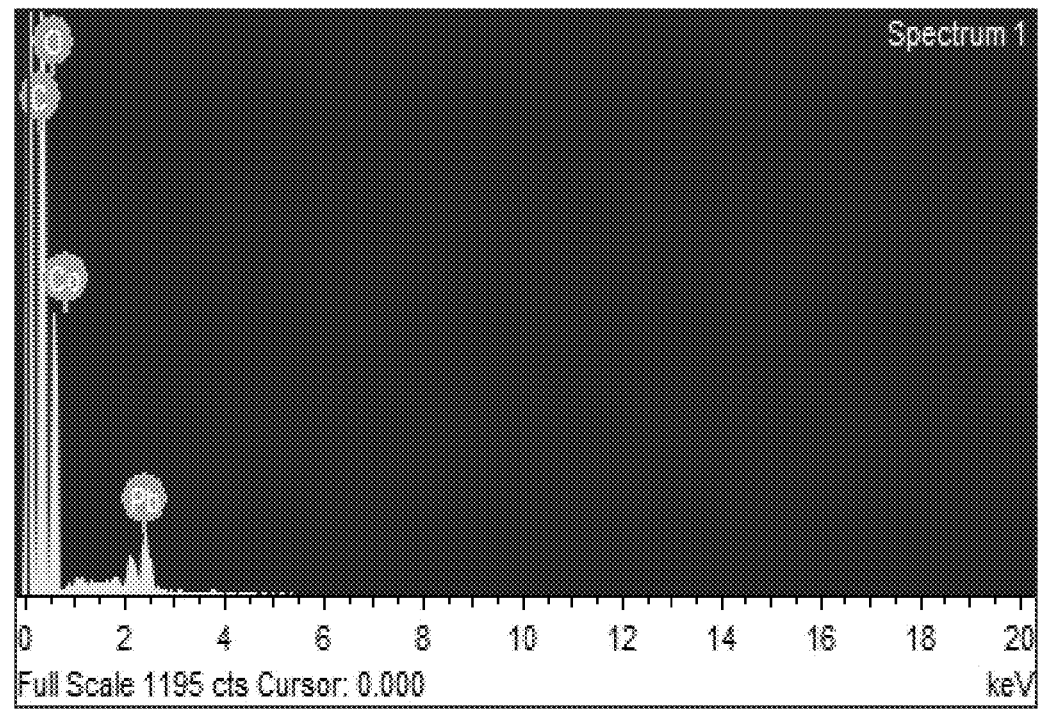

Pure polyester and lead oxide/polyester nanocomposites were analyzed using EDS. FIGS. 4-8 show representative SEM and EDS images of PE0, PE10, PE20, PE30 and PE 40, respectively. EDS spectrum of the polyester nanocomposite with $Pb_3O_4$ of 0 wt % (FIGS. 4A and 4B), 10 wt % (FIGS. 5A and 5B), 20 wt % (FIGS. 6A and 6B), 30 wt % (FIGS. 7A and 7B), and 40 wt % (FIGS. 8A and 8B). It shows high bonding strength that occurs between the lead and polyester matrix achieved in the formulations containing $Pb_3O_4$, as shown in FIGS. 5A/B to 8A/B.

Example 5

Analysis of Polymer Nanocomposite Materials Using FTIR Spectroscopy.

Figure 9:
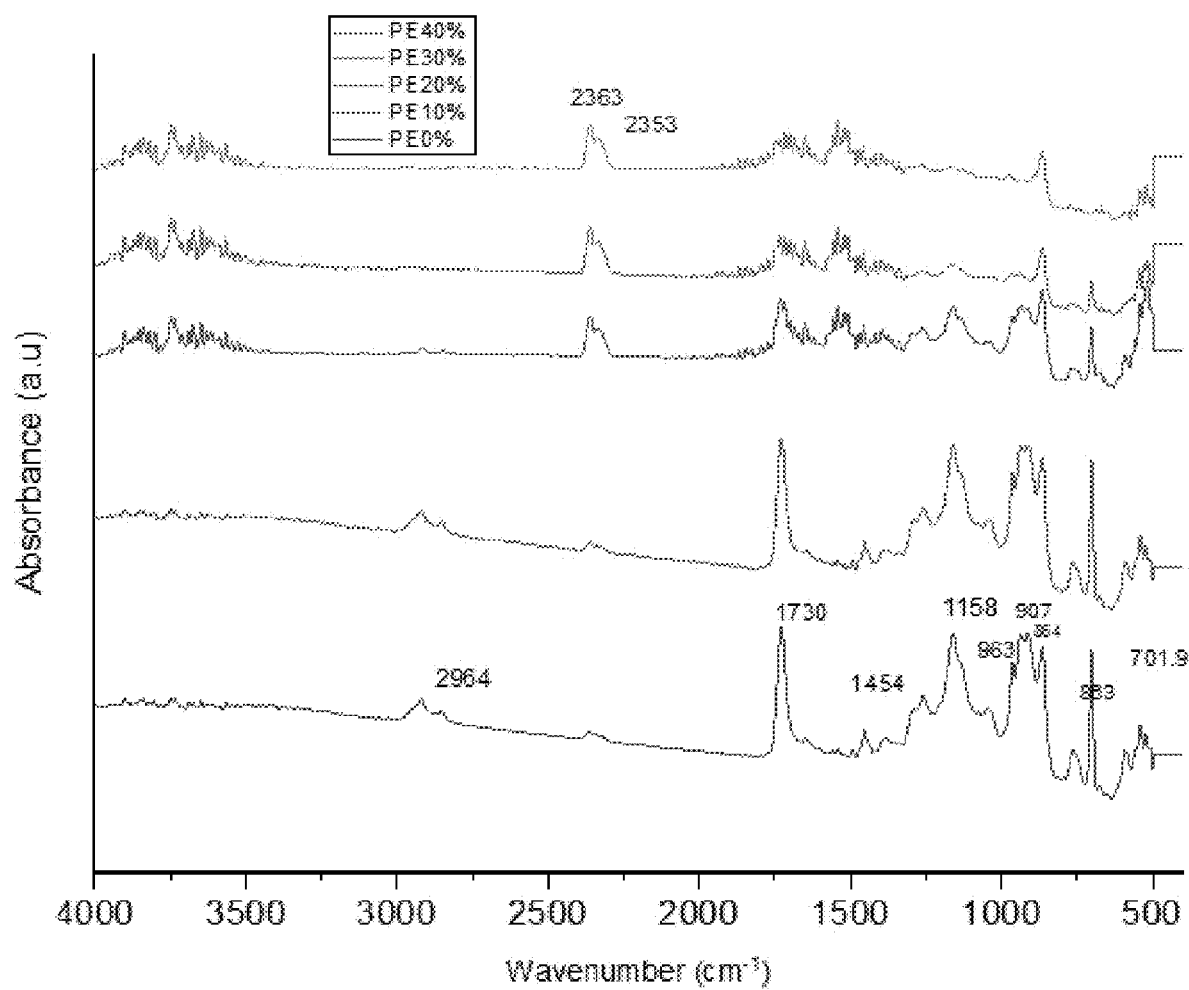
FIG. 9 shows FTIR of pure polyester (PE0) compared to different weight percentages of lead oxide embedded in polyester polymer of nanocomposites (PE10, PE20, PE30 and PE40).

To find the mechanism of $Pb_3O_4$ composite functional polyester, the infrared spectra of pure polyester and various weight percentages $Pb_3O_4$ mixed with polyesters were analyzed to identify chemical bonds. As shown in FIG. 9, the band at 3784 $cm^{-1}$ is ascribed to —OH group, while those at 2961 $cm^{-1}$ and 1454 $cm^{-1}$ are assigned to the C—H stretching vibration. FIG. 9 shows the FTIR spectra of pure polyester (PE0) and lead oxide/polyester nanocomposites at various concentrations of lead oxide (PE10%, PE20, PE30 and PE40), with weight % for each shown in Table 5.

Table 5. Weight percentage of chemical elements in the polymer nanocomposite with various $Pb_3O_4$ concentrations.

TABLE 5

Weight percentage of chemical elements in the polymer nanocomposite with various $Pb_3O_4$ concentrations.

| Sample | Weight percentage of chemical elements | | | |
|---|---|---|---|---|
| | C | O | Co | Pb |
| PE0 | 69.485 | 30.49 | 0.025 | 0 |
| PE10 | 66.703 | 30.34 | 0.027 | 2.93 |
| PE20 | 61.807 | 30.49 | 0.027 | 7.676 |
| PE30 | 54.388 | 35.4 | 0.022 | 10.19 |
| PE40 | 50.92 | 33.5 | 0.02 | 15.56 |

The strong band at 1724 $cm^{-1}$ is attributed to the stretching vibration of the carbonyl stretch C=O bond, which is characteristic of an ester group and disappeared as the lead oxide content increased, especially at high concentrations of lead oxide (i.e., 30 and 40 wt % $Pb_3O_4$) in polymer network that leads to the subtle changes in C=O bonds. Also, more than two bands in the range 1000-1300 $cm^{-1}$ are characteristics of an ester group and attribute the stretched vibration of C—O bond that also disappeared with the addition of high concentrations of lead oxide. The two bands in the range 2950-2865 are attributed to a C—H bond that also disappeared as $Pb_3O_4$ content increased in polyester matrix. However, the bond centered at 3741 $cm^{-1}$ is related to O—H and was enhanced at higher lead oxide content. FTIR results proved that the addition of lead oxide induces observable change in vibration modes. There was an obvious enhancement associated with FTIR spectra of high concentrations of leas oxide/polyester compared with the spectra of pure polyester, illustrated by the band peak at 2363 and 2353 $cm^{-1}$. These two bands may be attributed to the band of Pb-0 vibrations.

Example 6

Analysis of Linear Attenuation Coefficients

Figure 10A:
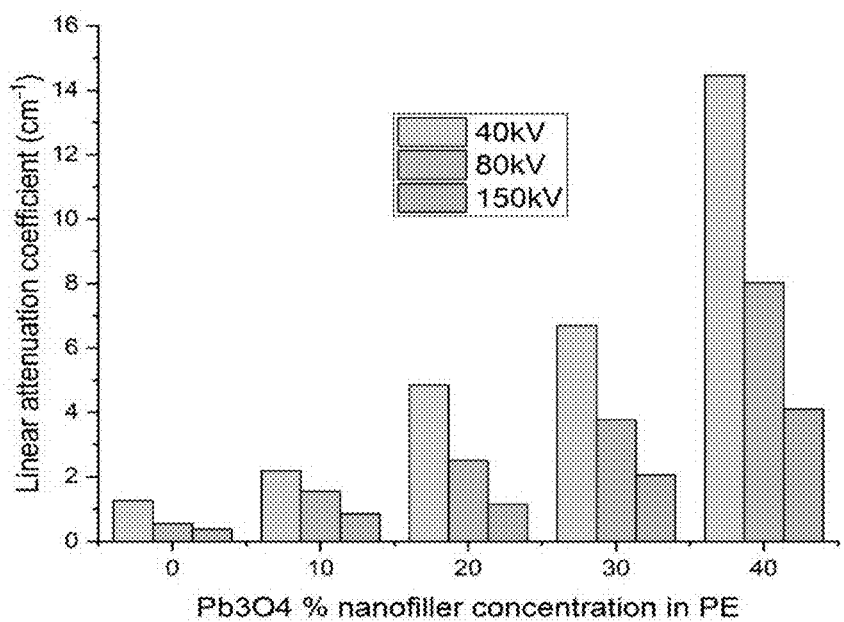
FIGS. 10A and 10B show linear attenuation coefficients for pure polyester (PE0) compared to different weight percentages of lead oxide embedded in polyester polymer (nanocomposites PE10, PE20, PE30 and PE40) for two types of x-ray tubes. See also Table 2 for features of each type of x-ray tube. 10A shows the results using a diagnostic x-ray tube with energies of 40, 80 or 150 kV, and 10B shows the results using a medium x-ray tube with energies of 120, 150, 200 or 250 kV.
Figure 10B:
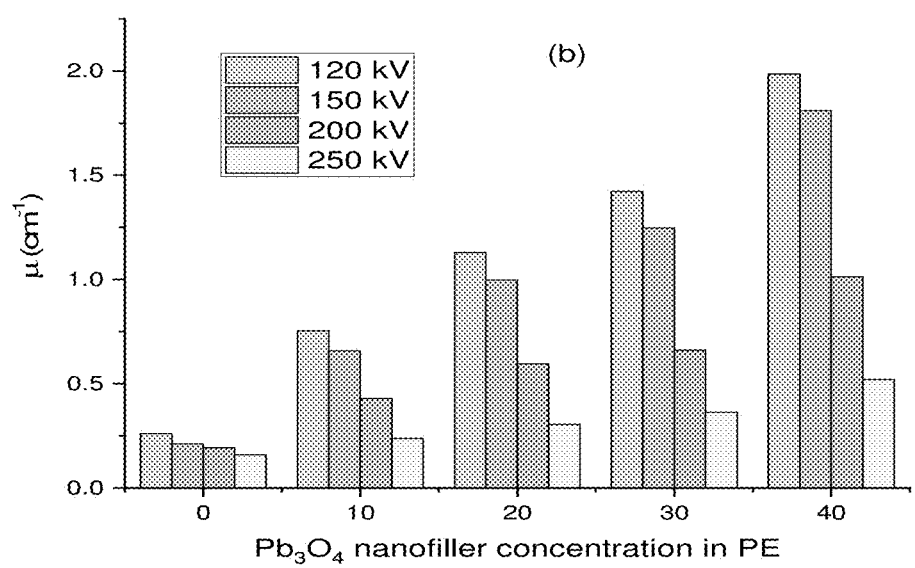

Attenuation factor was evaluated for an average of each 5 points of measurements. Three diagnostic x-ray energies (40, 80 and 150 kV) and four medium x-ray energies (120, 150, 200 and 250 kV) were used (see Table 3 for characteristics of diagnostic and medium x-rays). The linear attenuation coefficients for pure polyester (PE0) were compared to different weight percentages of lead oxide embedded in polyester polymer (nanocomposites PE10, PE20, PE30 and PE40. As shown in FIG. 10, PE40, which has the highest fraction of lead oxide, also has the highest linear attenuation coefficient (LAC) among all the polyester nanocomposites at all the energies measured. The better performance of PE40 over other PE nanocomposites can be attributed to the relatively high atomic number and density of lead oxide embedded in polyester nanocomposite, which are both very important factors in determining radiation attenuation, especially within the diagnostic energy range. At 40 kV, the decrease in transmission factors are remarkable due to the predominance of photoelectric effect at this energy. Moreover, it reached the lower value at 40% weight percentage of $Pb_3O_4$. This means that the more $Pb_3O_4$ is present in the composite, the more radiation shielding is provided.

Figure 11A:
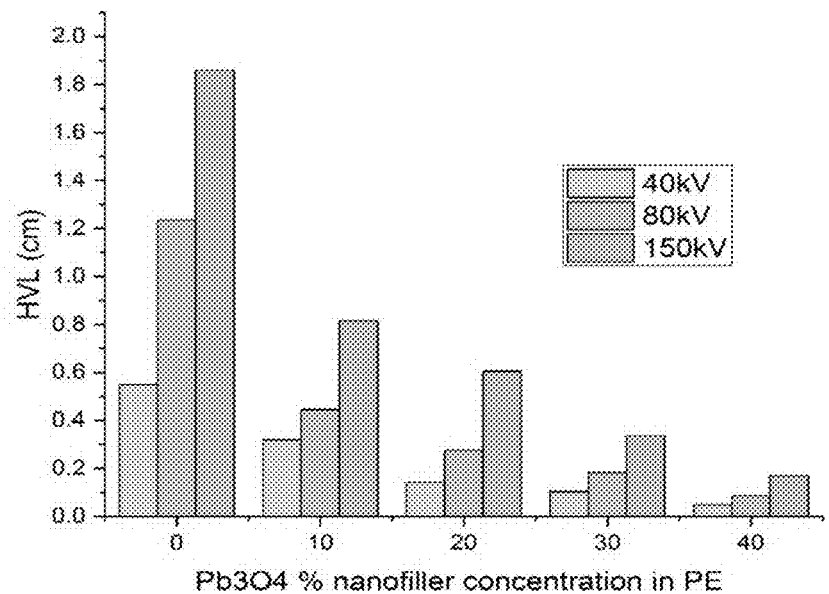
FIGS. 11A and 11B show the half value layer (HVL) for pure polyester (PE0) compared to different weight percentages of lead oxide embedded in polyester polymer nanocomposites (PE10, PE20, PE30 and PE40) at various voltages.
Figure 11B:
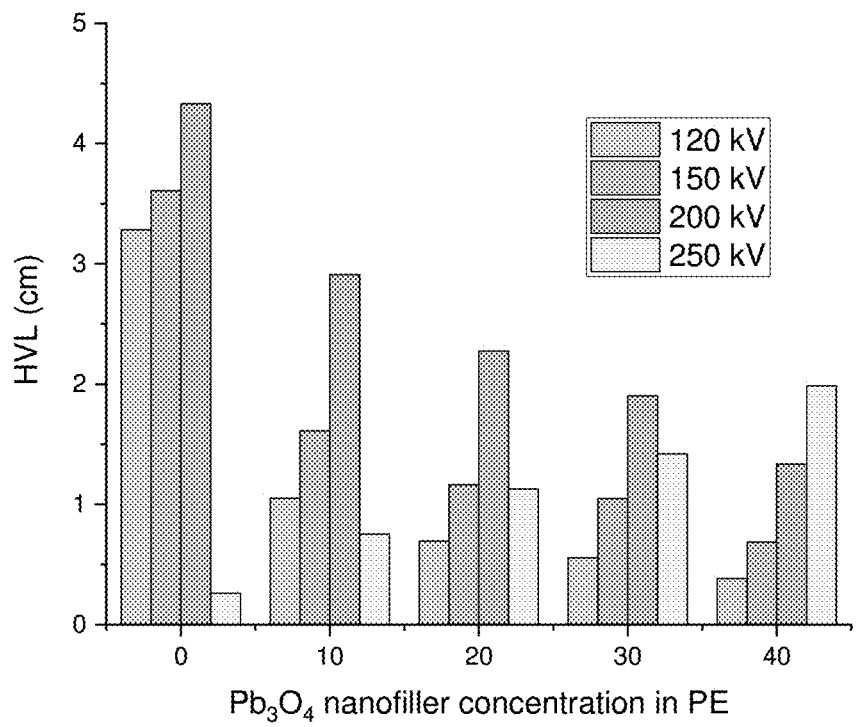

Half value layer (HVL) is the thickness of any substance, where one-half of the radiation intensity incident on it is removed. HVL is determined using mathematical statement of Ln 2/μ, where μ is the experimental linear attenuation coefficient of the lead oxide/polyester nanocomposites. FIGS. 11A and 11B represent HVL at two different applications (low and medium x-ray). FIG. 11A shows a graph of half value layers of composites sample at 40, 80 and 150 kV. From FIG. 11, it can be seen that the thickness required to attenuate the 50% intensity of X-rays at 40 and 80 kV is almost same with that the leaded polyester. This shows that the $Pb_3O_4$ nanofiller is a promising material at 40, 80 and 150 kV.

Example 7

Transmission Factor of Various Thicknesses of Nanocomposite Materials

Figure 12A:
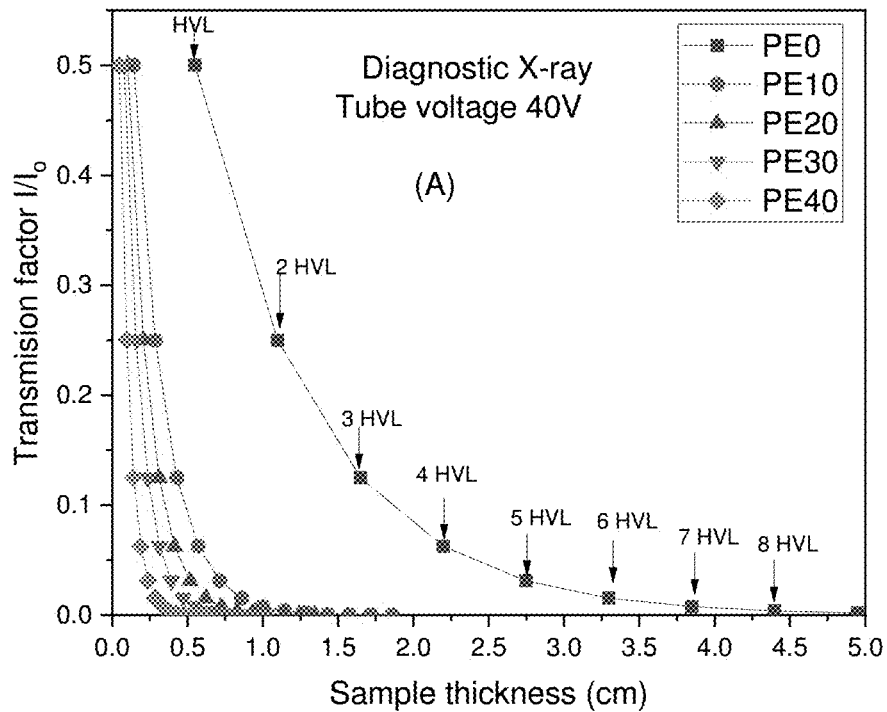
FIGS. 12A-12C show the transmission factor ($I/I_o$) versus sample thickness in terms of half value layers for radiation generated by a diagnostic x-ray tube.
Figure 12B:
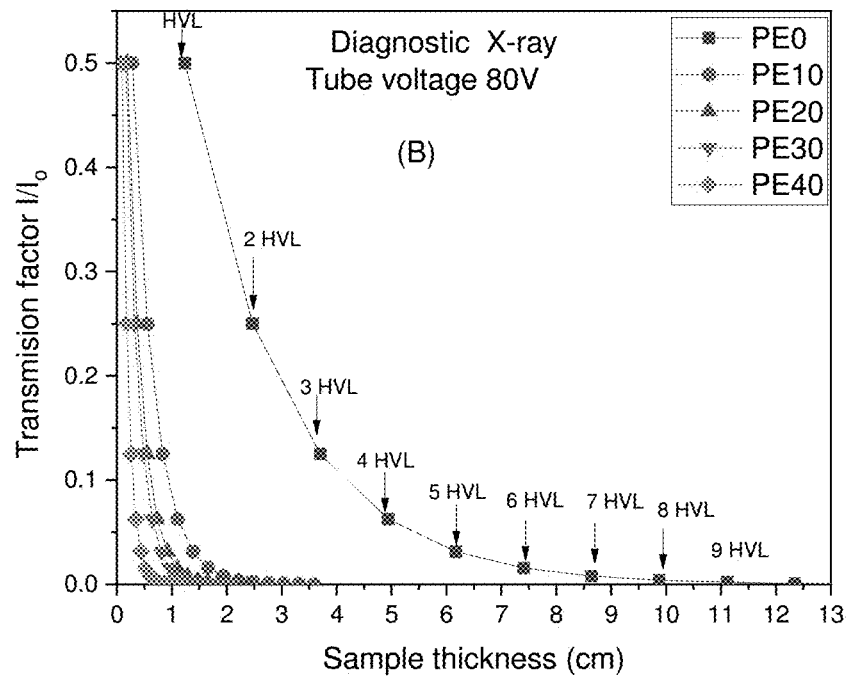
Figure 12C:
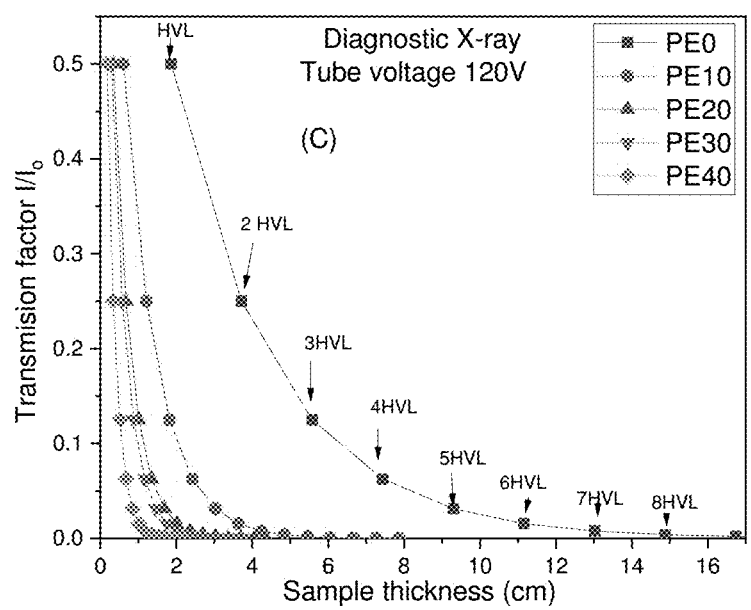
Figure 13A:
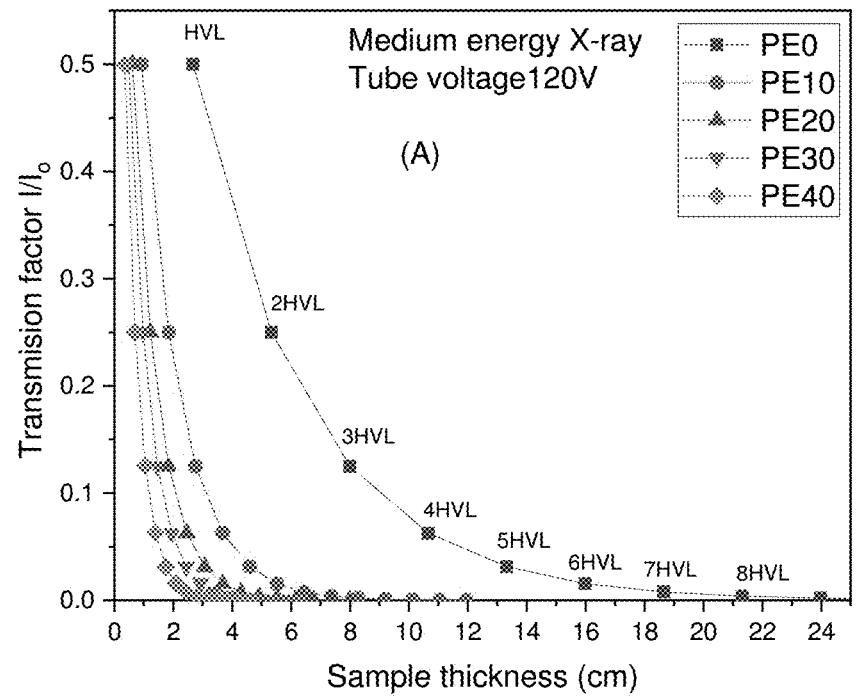
FIGS. 13A-13D show the transmission factor ($I/I_o$) versus sample thickness in terms of half value layers for radiation generated by a medium x-ray tube.
Figure 13B:
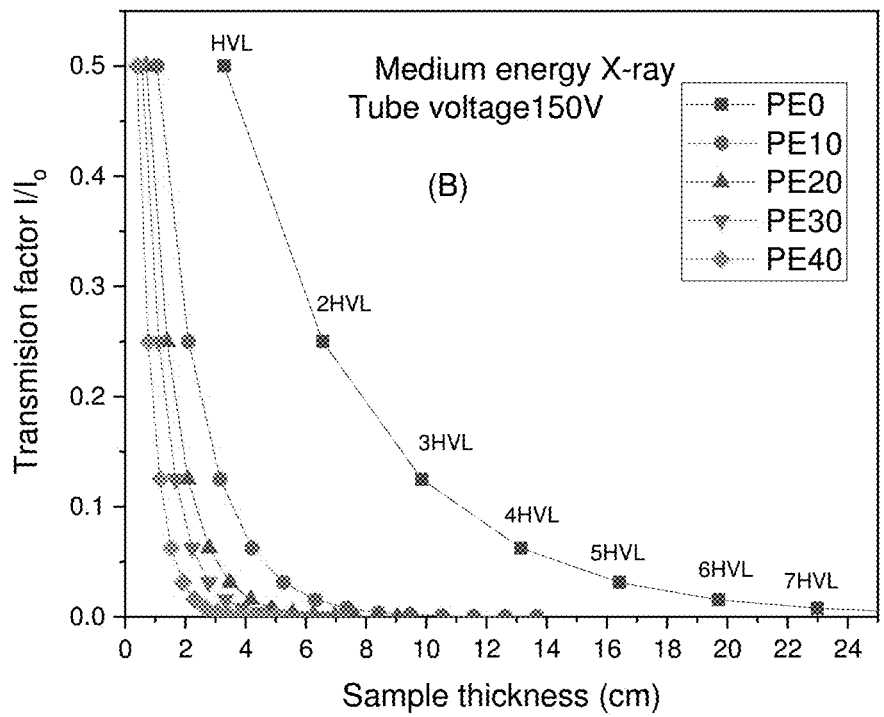
Figure 13C:
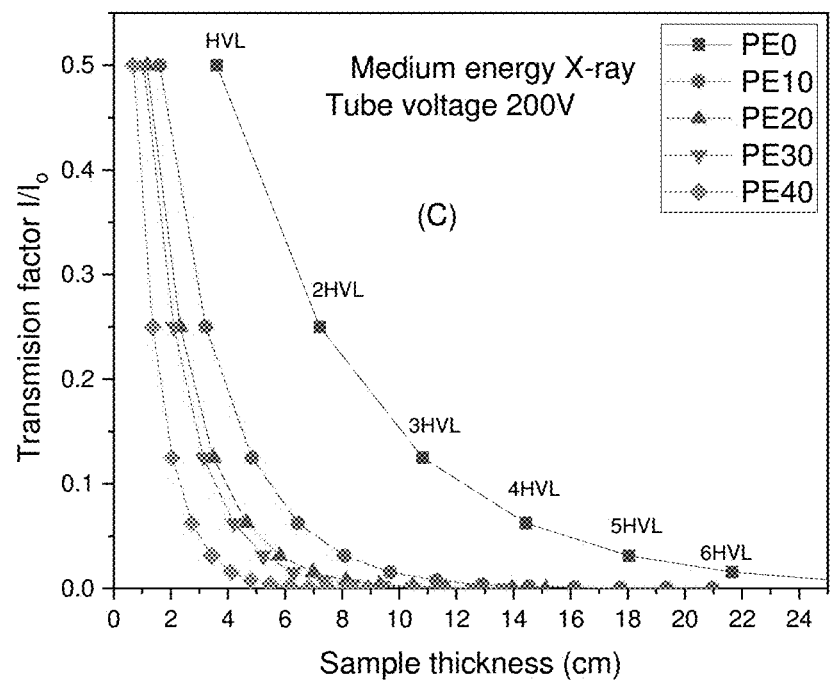
Figure 13D:
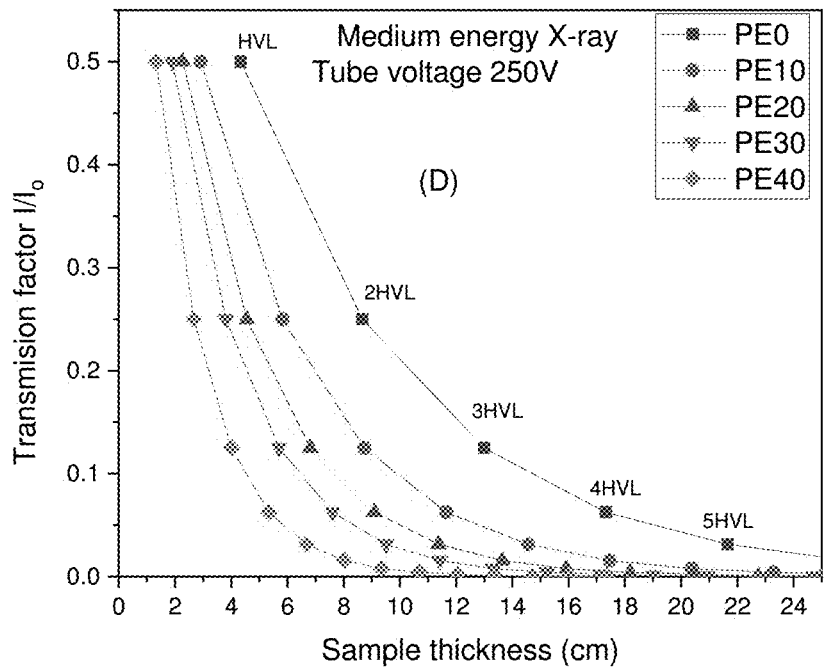

Transmission factor ($I/I_o$) is the ratio between the incident radiation on the shields and transmitted radiation after passing out the shield, which is equal to $2^{-HVLs}$. Using various samples of the nanocomposite materials, the $I/I_o$ versus thickness was estimated. FIGS. 12A-12C show the $I/I_o$ versus thickness for shielding radiation generated with a diagnostic x-ray tube, and FIGS. 13A-13D show the $I/I_o$ versus thickness for shielding radiation generated with a medium energy x-ray tube.

Related to the data shown in FIGS. 12A-12C and FIGS. 13A-13D, Table 6 provides parameters of the estimated thicknesses required to achieve zero transmitted radiation though different polyester nanocomposites and for different x-ray generators.

TABLE 6

Estimated thickness (cm) needed to totally block radiation.

| Tube voltage | | Estimated thickness (cm) that totally absorbs radiation | | | | |
|---|---|---|---|---|---|---|
| | | PE0 | PE10 | PE20 | PE30 | PE40 |
| Diagnostic X-ray | 40 | 5 | 0.6 | 0.5 | 0.4 | 0.2 |
| | 80 | 10 | 2 | 1.2 | 1 | 0.5 |
| | 150 | 15 | 4.5 | 2.3 | 2 | 0.6 |
| Medium x-ray | 120 | 24 | 8 | 5 | 4 | 2.3 |
| | 150 | 26 | 8.5 | 6 | 5 | 3 |
| | 200 | 28 | 15 | 8 | 10 | 6 |
| | 250 | 30 | 20 | 18 | 16 | 11 |

Example 8

Thermal Gravimetric Analysis (TGA)

Figure 14:
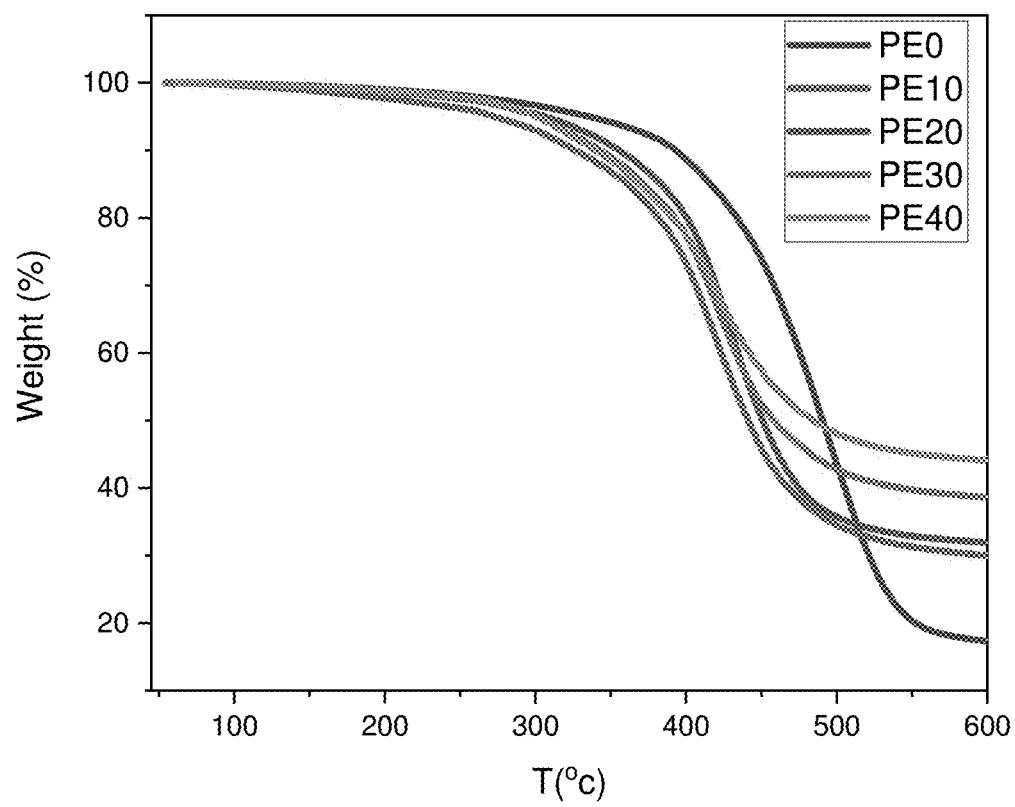
FIG. 14 shows TGA curves of polyester nanocomposites loaded with different ratios of $Pb_3O_4$ nanocrystals (10.0, 20.0, 30.0, 40.0).
Figure 15A:
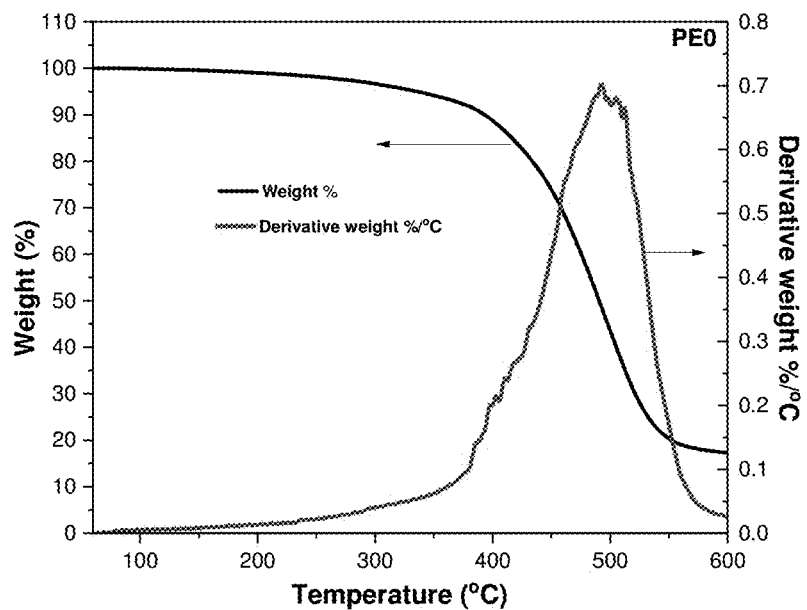
FIGS. 15A-15E show graphs of first derivative of TGA curves in order to determine peak temperatures for PE0-PE40, respectively.
Figure 15B:
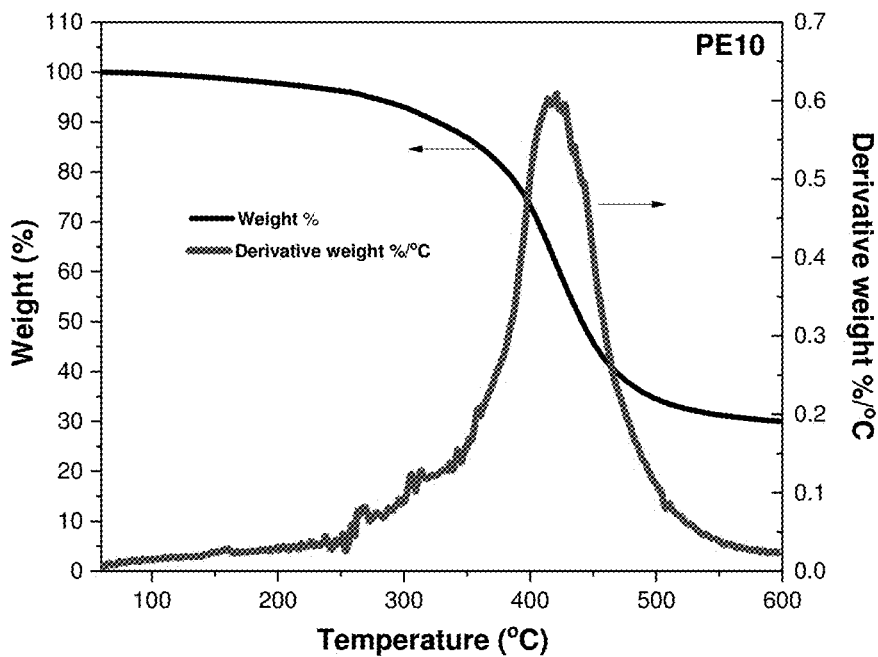
Figure 15C:
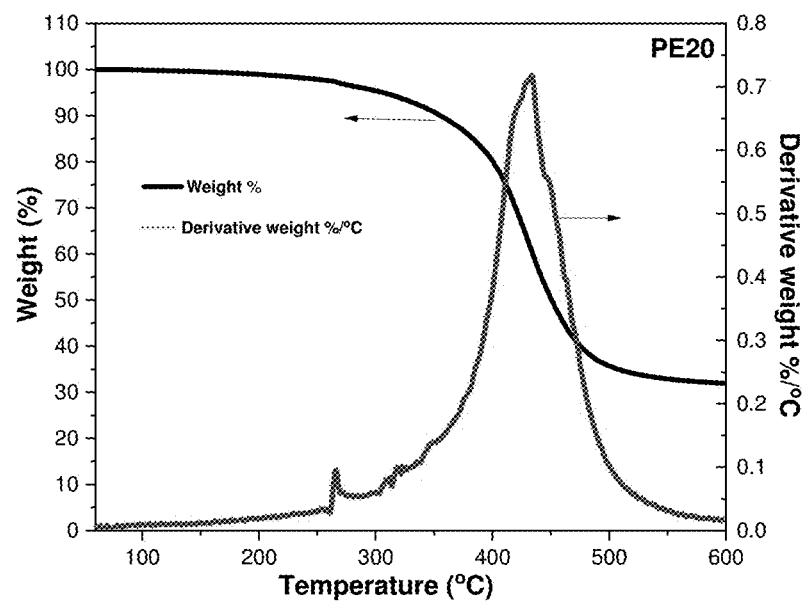
Figure 15D:
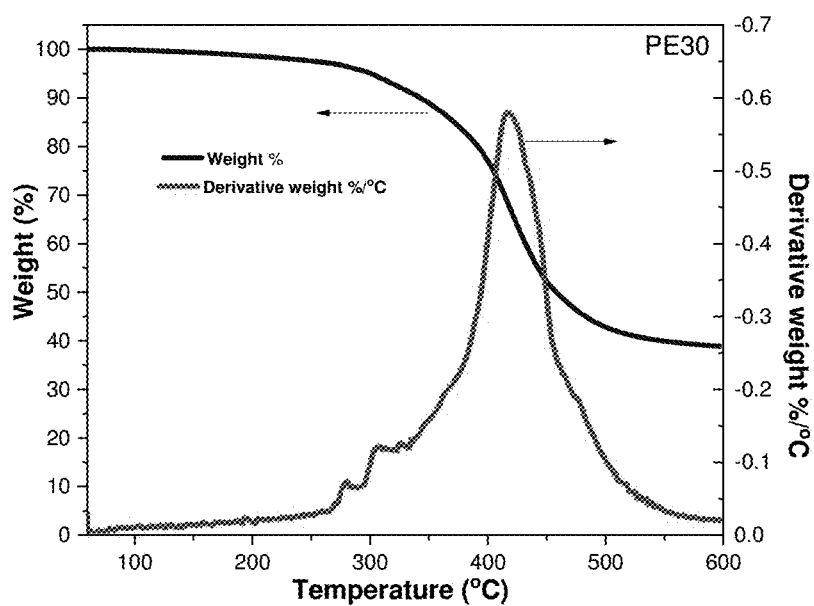
Figure 15E:
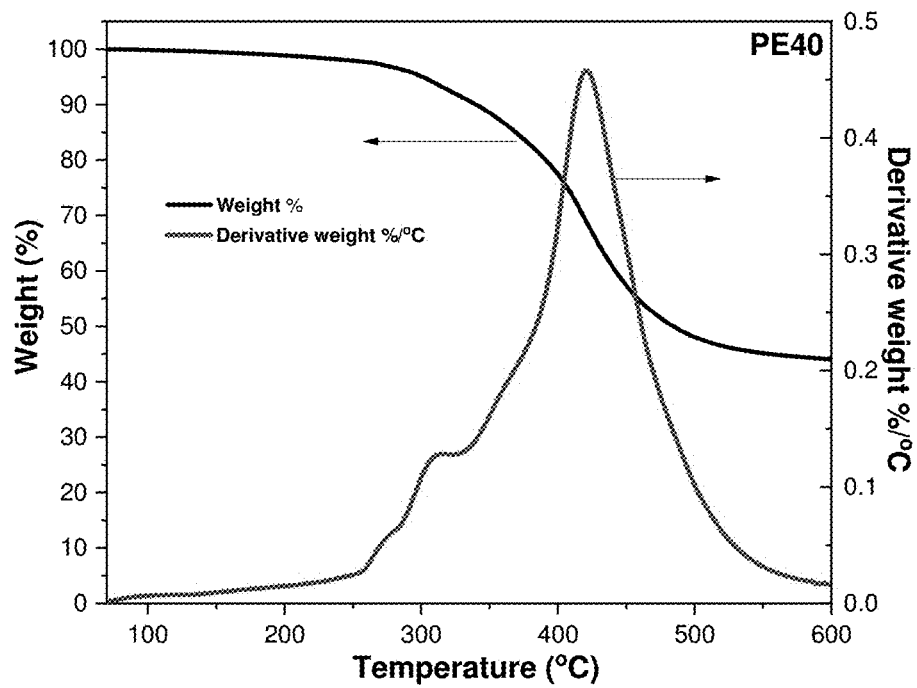

Thermal gravimetric measurements were carried out from 23° C. to 600° C. using TA instruments SDT Q600 TGA thermal thermogravimetric analyzer at a heating rate of 10° C./min. TGA curves of polyester nanocomposites loaded with different ratios of $Pb_3O_4$ nanocrystals (PE0, PE10, PE20, PE30, PE40) are shown in FIG. 14A. As depicted in FIG. 15B-15E, each formulation has single degradation stage with peak temperature ranged (418° C.-433° C.) in polyester/$Pb_3O_4$ nanocomposites, however, in pure polyester the peak temperature equals 493° C. (see FIG. 15A). Peak temperatures are shown in Table 6. The mass losses of polyester/$Pb_3O_4$ nanocomposites decrease as the concentration of nanoparticles increases. Such decreases in mass losses as the filler concentration increases enhance thermal stability in comparison to the pure polyester material (PE0).

TABLE 6

Peak temperatures for each formulation in ° C. extracted from first derivative of TGA curves.

| Sample | Peak temperature ° C. |
|---|---|
| PE0 | 492.77 |
| PE10 | 419.26 |
| PE20 | 433.29 |
| PE30 | 419.75 |
| PE40 | 421.03 |

Conclusion

In these Examples of the invention, $Pb_3O_4$/polyester nanocomposite coatings and structures with different concentrations of lead oxide were prepared in order to be used in medical radiology bunkers as radiation shields. Shielding against ionizing radiation is still considered a crucial issue for radiation safety of patients and workers at radiology centers. The present invention is first in this field that uses polyester nanocomposite coatings or structures for shielding of diagnostic radiation. The shielding property of the invention provided a surprising degree of shielding in the diagnostic energy range. In particular, the nanocomposite materials of the invention are particularly well-suited for the composite preparation because it has shown higher effectiveness in radiation shielding. The preparation of the polymer nanocomposite was fabricated by using the open mold cast technique. Polyester nanocomposite was embedded with lead oxide ($Pb_3O_4$) nanopowder in different concentrations, e.g., 10%, 20%, 30% and 40% weight percentage to polyester matrix. XRD was tested for all samples and lead oxide which ensured the nanostructure size of sample around 22 nm using the Scherrer formula and W-H equations. SEM was also performed for all samples and showed good homogenous distribution of white nanoparticles that correlated to lead oxide, which is affected by its concentration in polymer matrix. In addition, infrared spectroscopy implemented through FTIR testing showed a clear change in the vibration mode. The carbonyl bond disappeared as the lead oxide content increased in polymer matrix. This finding supports the concept of substitute carbons in the network by lead atoms.

Radiation shielding test was implemented using two different x-ray beam tubes at different tube voltages (40, 80 and 120 kV) of diagnostic ranges; (120, 150, 200, and 250 kV) of medium energy. The attenuation factor was found to decrease as lead oxide content increased. Half value layer and linear attenuation factor were calculated and demonstrated that the PE40 (with 40% of lead oxide content embedded in the polyester matrix) was the best radiological shield among other samples.

While the invention has been described in terms of its several exemplary embodiments, those skilled in the art will recognize that the invention can be practiced with modification within the spirit and scope of the appended claims. Accordingly, the present invention should not be limited to the embodiments as described above but should further include all modifications and equivalents thereof within the spirit and scope of the description provided herein.

I claim:

1. A method of making and using a nanocomposite material for shielding x-ray radiation generated from an X-ray beam tube operating at a voltage of 40 killivolts (kV) to 250 kV, comprising:
    fabricating the nanocomposite material comprising
        forming a homogenous mixture of
            a polyester polymer,
            an accelerator for crosslinking polymer chains of the polyester polymer, and
            $Pb_3O_4$ nanopowder of $Pb_3O_4$ particles, wherein the $Pb_3O_4$ is present at a concentration of 10% to 50% by weight, and
        casting the homogenous mixture in a mold or on a surface, and
        curing the homogenous mixture to produce the nanocomposite material which is comprised of a crosslinked polyester material with the $Pb_3O_4$ particles uniformly distributed and embedded therein, wherein the nanocomposite material has a thickness of 0.2 cm to 20 cm; and
    positioning the nanocomposite material in a location that provides shielding and attenuation of x-ray radiation; for at least one object and/or person selected from the group consisting of a target, a bystander, a practitioner, a patient, and a body part or region of a patient.

2. The method of claim 1, wherein the $Pb_3O_4$ concentration is in the range of 30% to 40%.

3. The method of claim 1, wherein the $Pb_3O_4$ concentration is 40%.

4. The method of claim 1, wherein the nanocomposite material has a thickness in the range of 0.2 to 16 cm.

5. The method of claim 1, wherein the nanocomposite material is applied to an existing structure.

* * * * *